US011665207B2

(12) United States Patent
Higgins et al.

(10) Patent No.: US 11,665,207 B2
(45) Date of Patent: *May 30, 2023

(54) INLINE SECRET SHARING

(71) Applicant: ExtraHop Networks, Inc., Seattle, WA (US)

(72) Inventors: Benjamin Thomas Higgins, Shoreline, WA (US); Jesse Abraham Rothstein, Seattle, WA (US)

(73) Assignee: ExtraHop Networks, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/515,963

(22) Filed: Nov. 1, 2021

(65) Prior Publication Data

US 2022/0060518 A1 Feb. 24, 2022

Related U.S. Application Data

(63) Continuation of application No. 15/971,843, filed on May 4, 2018, now Pat. No. 11,165,831, which is a (Continued)

(51) Int. Cl.
*H04L 9/40* (2022.01)
*G06F 21/60* (2013.01)
(Continued)

(52) U.S. Cl.
CPC ............ *H04L 63/30* (2013.01); *G06F 21/606* (2013.01); *H04L 43/12* (2013.01);
(Continued)

(58) Field of Classification Search
CPC ..... G06F 21/50; G06F 21/606; H04L 43/026; H04L 43/062; H04L 43/12;
(Continued)

(56) References Cited

U.S. PATENT DOCUMENTS 5,027,269 A 6/1991 Grant et al.
5,430,727 A 7/1995 Callon
(Continued)

FOREIGN PATENT DOCUMENTS

AU 2003287262 A1 5/2004
AU 2008328833 A1 6/2009
(Continued)

OTHER PUBLICATIONS

Office Communication for U.S. Appl. No. 16/679,055 dated Nov. 12, 2021, pp. 1-34.
(Continued)

*Primary Examiner* — Alina A Boutah
(74) *Attorney, Agent, or Firm* — John W. Branch; Branch Partners PLLC

(57) ABSTRACT

Embodiments are directed to monitoring communication between computers using network monitoring computers (NMCs). NMCs identify a secure communication session established between two of the computers based on an exchange of handshake information associated with the secure communication session. Key information that corresponds to the secure communication session may be obtained from a key provider such that the key information may be encrypted by the key provider. NMCs may decrypt the key information. NMCs may derive the session key based on the decrypted key information and the handshake information. NMCs may decrypt network packets included in the secure communication session. NMCs may be employed to inspect the one or more decrypted network packets to execute one or more rule-based policies.

17 Claims, 10 Drawing Sheets

Related U.S. Application Data continuation of application No. 15/793,880, filed on Oct. 25, 2017, now Pat. No. 9,967,292.

(51) Int. Cl.
  *H04L 43/12* (2022.01)
  *H04L 43/062* (2022.01)
  *G06F 21/50* (2013.01)
  *H04L 43/026* (2022.01)

(52) U.S. Cl.
  CPC ...... *H04L 63/0218* (2013.01); *H04L 63/0428* (2013.01); *H04L 63/061* (2013.01); *H04L 63/062* (2013.01); *H04L 63/065* (2013.01); *G06F 21/50* (2013.01); *H04L 43/026* (2013.01); *H04L 43/062* (2013.01); *H04L 63/166* (2013.01); *H04L 63/20* (2013.01)

(58) Field of Classification Search
  CPC ............. H04L 63/0218; H04L 63/0428; H04L 63/061; H04L 63/062; H04L 63/065; H04L 63/166; H04L 63/20; H04L 63/30
  See application file for complete search history.

(56) References Cited

U.S. PATENT DOCUMENTS

| | | |
|---|---|---|
| 5,541,995 A | 7/1996 | Normile et al. |
| 5,548,646 A | 8/1996 | Aziz et al. |
| 5,715,464 A | 2/1998 | Crump et al. |
| 5,787,237 A | 7/1998 | Reilly |
| 5,802,599 A | 9/1998 | Cabrera et al. |
| 5,835,726 A | 11/1998 | Shwed et al. |
| 5,857,188 A | 1/1999 | Douglas |
| 5,928,363 A | 7/1999 | Ruvolo |
| 6,058,429 A | 5/2000 | Ames et al. |
| 6,141,686 A | 10/2000 | Jackowski et al. |
| 6,263,049 B1 | 7/2001 | Kuhn |
| 6,321,338 B1 | 11/2001 | Porras et al. |
| 6,385,729 B1 | 5/2002 | DiGiorgio et al. |
| 6,401,150 B1 | 6/2002 | Reilly |
| 6,405,250 B1 | 6/2002 | Lin et al. |
| 6,412,000 B1 | 6/2002 | Riddle et al. |
| 6,526,044 B1 | 2/2003 | Cookmeyer, II et al. |
| 6,636,838 B1 | 10/2003 | Perlman et al. |
| 6,704,311 B1 | 3/2004 | Chuah et al. |
| 6,704,874 B1 | 3/2004 | Porras et al. |
| 6,765,909 B1 | 7/2004 | Sen |
| 6,807,156 B1 | 10/2004 | Veres et al. |
| 6,807,565 B1 | 10/2004 | Dodrill et al. |
| 6,883,015 B1 | 4/2005 | Geen et al. |
| 6,901,517 B1 | 5/2005 | Redmore |
| 6,944,599 B1 | 9/2005 | Vogel et al. |
| 6,948,060 B1 | 9/2005 | Ramanathan |
| 6,968,554 B1 | 11/2005 | Macdonald et al. |
| 6,999,729 B2 | 2/2006 | Wandel |
| 7,042,888 B2 | 5/2006 | Berggreen |
| 7,047,303 B2 | 5/2006 | Lingafelt et al. |
| 7,089,326 B2 | 8/2006 | Boucher et al. |
| RE39,360 E | 10/2006 | Aziz et al. |
| 7,133,365 B2 | 11/2006 | Klinker et al. |
| 7,143,153 B1 | 11/2006 | Black et al. |
| 7,177,930 B1 | 2/2007 | LoPresti |
| 7,181,769 B1 | 2/2007 | Keanini et al. |
| 7,193,968 B1 | 3/2007 | Kapoor et al. |
| 7,222,366 B2 | 5/2007 | Bruton, III et al. |
| 7,313,141 B2 | 12/2007 | Kan et al. |
| 7,424,532 B1 | 9/2008 | Subbiah |
| 7,454,499 B2 | 11/2008 | Cantrell et al. |
| 7,457,870 B1 | 11/2008 | Lownsbrough et al. |
| 7,474,654 B2 | 1/2009 | Guru |
| 7,480,292 B2 | 1/2009 | Busi et al. |
| 7,509,680 B1 | 3/2009 | Sallam |
| 7,535,906 B2 | 5/2009 | Engbersen et al. |
| 7,543,146 B1 | 6/2009 | Karandikar et al. |
| 7,545,499 B2 | 6/2009 | Overbeck et al. |
| 7,554,983 B1 | 6/2009 | Muppala |
| 7,561,517 B2 | 7/2009 | Klinker et al. |
| 7,580,356 B1 | 8/2009 | Mishra et al. |
| 7,602,731 B2 | 10/2009 | Jain |
| 7,606,706 B1 | 10/2009 | Rubin et al. |
| 7,609,630 B2 | 10/2009 | Gobeil |
| 7,594,273 B2 | 11/2009 | Keanini et al. |
| 7,619,988 B2 | 11/2009 | Shimada et al. |
| 7,620,986 B1 | 11/2009 | Jagannathan et al. |
| 7,636,305 B1 | 12/2009 | Taylor et al. |
| 7,639,613 B1 | 12/2009 | Ghannadian et al. |
| 7,644,150 B1 | 1/2010 | Nucci et al. |
| 7,660,883 B2 | 2/2010 | Fowlow |
| 7,724,905 B2 | 5/2010 | Bleumer et al. |
| 7,739,497 B1 | 6/2010 | Fink et al. |
| 7,774,456 B1 | 8/2010 | Lownsbrough et al. |
| 7,809,829 B2 | 10/2010 | Kelly et al. |
| 7,810,151 B1 | 10/2010 | Guruswamy |
| 7,817,549 B1 | 10/2010 | Kasralikar et al. |
| 7,849,502 B1 | 12/2010 | Bloch et al. |
| 7,864,764 B1 | 1/2011 | Ma et al. |
| 7,916,652 B1 | 3/2011 | Lima et al. |
| 7,936,682 B2 | 5/2011 | Singh et al. |
| 7,937,755 B1 | 5/2011 | Guruswamy |
| 7,944,822 B1 | 5/2011 | Nucci et al. |
| 7,975,139 B2 | 7/2011 | Coulier |
| 7,979,555 B2 | 7/2011 | Rothstein et al. |
| 7,979,694 B2 | 7/2011 | Touitou et al. |
| 8,040,798 B2 | 10/2011 | Chandra et al. |
| 8,079,083 B1 | 12/2011 | Bennett et al. |
| 8,102,783 B1 | 1/2012 | Narayanaswamy et al. |
| 8,107,397 B1 | 1/2012 | Bagchi et al. |
| 8,125,908 B2 | 2/2012 | Rothstein et al. |
| 8,185,953 B2 | 5/2012 | Rothstein et al. |
| 8,194,542 B2 | 6/2012 | Väänänen et al. |
| 8,352,725 B1 | 1/2013 | O'Toole, Jr. |
| 8,402,540 B2 | 3/2013 | Kapoor et al. |
| 8,411,677 B1 | 4/2013 | Colloff |
| 8,418,249 B1 | 4/2013 | Nucci et al. |
| 8,443,190 B2 | 5/2013 | Breton et al. |
| 8,457,127 B2 | 6/2013 | Eastham et al. |
| 8,494,985 B1 | 7/2013 | Keralapura et al. |
| 8,533,254 B1 | 9/2013 | Whitson, Jr. et al. |
| 8,555,383 B1 | 10/2013 | Marhsall et al. |
| 8,561,177 B1 | 10/2013 | Aziz et al. |
| 8,577,817 B1 | 11/2013 | Keralapura et al. |
| 8,578,024 B1 | 11/2013 | Keralapura et al. |
| 8,601,531 B1 | 12/2013 | Zolfonoon et al. |
| 8,613,089 B1 | 12/2013 | Holloway et al. |
| 8,619,579 B1 | 12/2013 | Rothstein et al. |
| 8,627,422 B2 | 1/2014 | Hawkes et al. |
| 8,635,441 B2 | 1/2014 | Frenkel et al. |
| 8,667,151 B2 | 3/2014 | Mizikovsky et al. |
| 8,699,357 B2 | 4/2014 | Deshpande et al. |
| 8,707,440 B2 | 4/2014 | Gula et al. |
| 8,744,894 B2 | 6/2014 | Christiansen et al. |
| 8,782,393 B1 * | 7/2014 | Rothstein ............ H04L 63/0281 726/13 |
| 8,817,655 B2 | 8/2014 | Szabo et al. |
| 8,843,627 B1 | 9/2014 | Baldi et al. |
| 8,848,744 B1 | 9/2014 | Rothstein et al. |
| 8,861,397 B2 | 10/2014 | Kind et al. |
| 8,959,643 B1 | 2/2015 | Invernizzi et al. |
| 8,964,548 B1 | 2/2015 | Keralapura et al. |
| 8,971,196 B2 | 3/2015 | Degioanni et al. |
| 9,026,467 B2 | 5/2015 | Bammi et al. |
| 9,036,493 B2 | 5/2015 | Degioanni et al. |
| 9,038,178 B1 | 5/2015 | Lin |
| 9,049,216 B2 | 6/2015 | McCanne et al. |
| 9,083,740 B1 | 7/2015 | Ma et al. |
| 9,094,288 B1 | 7/2015 | Nucci et al. |
| 9,094,326 B2 | 7/2015 | Sundararajan et al. |
| 9,158,604 B1 | 10/2015 | Christodorescu et al. |
| 9,176,838 B2 | 11/2015 | Li et al. |
| 9,183,573 B2 | 11/2015 | Tseng |
| 9,189,318 B2 | 11/2015 | Li et al. |
| 9,191,400 B1 | 11/2015 | Ptasinski et al. |
| 9,203,865 B2 | 12/2015 | Linden et al. |

(56) References Cited

U.S. PATENT DOCUMENTS

| | | |
|---|---|---|
| 9,264,288 B1 | 2/2016 | Arora et al. |
| 9,338,147 B1* | 5/2016 | Rothstein .............. H04L 63/061 |
| 9,357,410 B2 | 5/2016 | Nedeltchev et al. |
| 9,369,479 B2 | 6/2016 | Lin |
| 9,380,489 B2 | 6/2016 | Kotecha et al. |
| 9,391,866 B1 | 7/2016 | Martin et al. |
| 9,400,871 B1 | 7/2016 | Hewinson |
| 9,401,925 B1 | 7/2016 | Guo et al. |
| 9,426,036 B1 | 8/2016 | Roy |
| 9,430,646 B1 | 8/2016 | Mushtaq et al. |
| 9,432,430 B1 | 8/2016 | Klenz |
| 9,460,299 B2 | 10/2016 | Weiss et al. |
| 9,461,875 B2 | 10/2016 | Groat et al. |
| 9,479,405 B1 | 10/2016 | Tongaonkar et al. |
| 9,483,742 B1 | 11/2016 | Ahmed |
| 9,516,053 B1 | 12/2016 | Muddu et al. |
| 9,531,736 B1 | 12/2016 | Torres et al. |
| 9,565,202 B1 | 2/2017 | Kindlund et al. |
| 9,565,203 B2 | 2/2017 | Bernstein et al. |
| 9,591,015 B1 | 3/2017 | Amin et al. |
| 9,621,523 B2 | 4/2017 | Rothstein et al. |
| 9,654,503 B1 | 5/2017 | Kowalyshyn |
| 9,660,879 B1 | 5/2017 | Rothstein et al. |
| 9,692,658 B2 | 6/2017 | Guo et al. |
| 9,715,820 B1 | 7/2017 | Boss et al. |
| 9,729,416 B1 | 8/2017 | Khanal et al. |
| 9,860,209 B2 | 1/2018 | Buchanan et al. |
| 9,876,810 B2 | 1/2018 | McDougal et al. |
| 9,888,021 B2 | 2/2018 | Horesh et al. |
| 9,893,897 B2 | 2/2018 | Li et al. |
| 9,967,292 B1* | 5/2018 | Higgins ................. H04L 63/30 |
| 10,009,364 B2 | 6/2018 | Dasgupta et al. |
| 10,009,793 B2 | 6/2018 | Wetterwald et al. |
| 10,027,689 B1 | 7/2018 | Rathor et al. |
| 10,028,167 B2 | 7/2018 | Calin et al. |
| 10,033,766 B2 | 7/2018 | Gupta et al. |
| 10,038,611 B1 | 7/2018 | Wu et al. |
| 10,050,982 B1 | 8/2018 | Guerra et al. |
| 10,063,434 B1 | 8/2018 | Khanal et al. |
| 10,122,748 B1 | 11/2018 | Currie |
| 10,176,323 B2 | 1/2019 | Zhang et al. |
| 10,198,667 B2 | 2/2019 | Ryan, Jr. et al. |
| 10,204,211 B2 | 2/2019 | Hammerle et al. |
| 10,237,294 B1 | 3/2019 | Zadeh et al. |
| 10,263,883 B2 | 4/2019 | Kamble |
| 10,264,003 B1 | 4/2019 | Wu et al. |
| 10,270,794 B1 | 4/2019 | Mukerji et al. |
| 10,277,618 B1 | 4/2019 | Wu et al. |
| 10,305,928 B2 | 5/2019 | McGrew et al. |
| 10,320,749 B2 | 6/2019 | Sengupta et al. |
| 10,321,344 B2 | 6/2019 | Barton et al. |
| 10,326,676 B1 | 6/2019 | Driggs et al. |
| 10,332,005 B1 | 6/2019 | Liao et al. |
| 10,348,767 B1 | 7/2019 | Lee et al. |
| 10,375,155 B1 | 8/2019 | Cai et al. |
| 10,380,498 B1 | 8/2019 | Chaoji et al. |
| 10,389,574 B1 | 8/2019 | Wu et al. |
| 10,411,978 B1 | 9/2019 | Ball et al. |
| 10,412,080 B1 | 9/2019 | Edwards et al. |
| 10,419,454 B2 | 9/2019 | El-Moussa et al. |
| 10,476,673 B2* | 11/2019 | Higgins ................. H04L 9/0841 |
| 10,536,268 B2 | 1/2020 | Anderson et al. |
| 10,536,475 B1 | 1/2020 | McCorkle, Jr. et al. |
| 10,554,665 B1 | 2/2020 | Badawy et al. |
| 10,581,915 B2 | 3/2020 | Scherman et al. |
| 10,594,664 B2 | 3/2020 | Zaifman et al. |
| 10,594,718 B1 | 3/2020 | Deaguero et al. |
| 10,728,126 B2 | 7/2020 | Wu et al. |
| 10,742,677 B1 | 8/2020 | Wu et al. |
| 10,778,700 B2 | 9/2020 | Azvine et al. |
| 10,805,338 B2 | 10/2020 | Kohout et al. |
| 10,841,194 B2 | 11/2020 | Kim et al. |
| 10,944,769 B2 | 3/2021 | Singh |
| 10,992,693 B2 | 4/2021 | Luo et al. |
| 11,057,420 B2 | 7/2021 | McGrew et al. |
| 11,159,549 B2 | 10/2021 | El-Moussa et al. |
| 11,165,831 B2* | 11/2021 | Higgins .............. H04L 63/0218 |
| 11,194,901 B2 | 12/2021 | El-Moussa et al. |
| 11,201,876 B2 | 12/2021 | Kallos et al. |
| 11,310,256 B2 | 4/2022 | Higgins et al. |
| 11,388,072 B2 | 7/2022 | Wu et al. |
| 2001/0054157 A1 | 12/2001 | Fukumoto |
| 2002/0023080 A1 | 2/2002 | Uga et al. |
| 2002/0024964 A1 | 2/2002 | Baum et al. |
| 2002/0035604 A1 | 3/2002 | Cohen et al. |
| 2002/0055998 A1 | 5/2002 | Riddle et al. |
| 2002/0065912 A1 | 5/2002 | Catchpole et al. |
| 2002/0078382 A1 | 6/2002 | Sheikh et al. |
| 2002/0080720 A1 | 6/2002 | Pegrum et al. |
| 2002/0091844 A1 | 7/2002 | Craft et al. |
| 2002/0097724 A1 | 7/2002 | Halme et al. |
| 2002/0107953 A1 | 8/2002 | Ontiveros et al. |
| 2002/0133586 A1 | 9/2002 | Shanklin et al. |
| 2002/0133622 A1 | 9/2002 | Pinto |
| 2002/0152209 A1 | 10/2002 | Merugu et al. |
| 2002/0156880 A1 | 10/2002 | Mokuya |
| 2002/0175934 A1 | 11/2002 | Hand et al. |
| 2002/0178360 A1 | 11/2002 | Wenocur et al. |
| 2002/0184362 A1 | 12/2002 | Banerjee et al. |
| 2002/0194483 A1 | 12/2002 | Wenocur et al. |
| 2002/0194501 A1 | 12/2002 | Wenocur et al. |
| 2002/0199096 A1 | 12/2002 | Wenocur et al. |
| 2002/0199098 A1 | 12/2002 | Davis |
| 2003/0014628 A1 | 1/2003 | Freed et al. |
| 2003/0018891 A1 | 1/2003 | Hall et al. |
| 2003/0023733 A1 | 1/2003 | Lingafelt et al. |
| 2003/0084279 A1 | 5/2003 | Campagna |
| 2003/0093514 A1 | 5/2003 | Valdes et al. |
| 2003/0131116 A1 | 7/2003 | Jain et al. |
| 2003/0133443 A1 | 7/2003 | Klinker et al. |
| 2003/0135667 A1 | 7/2003 | Mann et al. |
| 2003/0145225 A1 | 7/2003 | Bruton, III et al. |
| 2003/0149887 A1 | 8/2003 | Yadav |
| 2003/0152094 A1 | 8/2003 | Colavito et al. |
| 2003/0156715 A1 | 8/2003 | Reeds, III et al. |
| 2003/0204621 A1 | 10/2003 | Poletto et al. |
| 2003/0212900 A1 | 11/2003 | Liu et al. |
| 2003/0214913 A1 | 11/2003 | Kan et al. |
| 2003/0217144 A1 | 11/2003 | Fu et al. |
| 2003/0233361 A1 | 12/2003 | Cady |
| 2004/0003094 A1 | 1/2004 | See |
| 2004/0047325 A1 | 3/2004 | Hameleers et al. |
| 2004/0049699 A1 | 3/2004 | Griffith et al. |
| 2004/0073512 A1 | 4/2004 | Maung |
| 2004/0088544 A1 | 5/2004 | Tariq et al. |
| 2004/0088557 A1 | 5/2004 | Malcolm et al. |
| 2004/0093414 A1 | 5/2004 | Orton |
| 2004/0093513 A1 | 5/2004 | Cantrell et al. |
| 2004/0146006 A1 | 7/2004 | Jackson |
| 2004/0162070 A1 | 8/2004 | Baral et al. |
| 2004/0199630 A1 | 10/2004 | Sarkissian et al. |
| 2004/0250059 A1 | 12/2004 | Ramelson et al. |
| 2005/0015455 A1 | 1/2005 | Liu |
| 2005/0015622 A1 | 1/2005 | Williams et al. |
| 2005/0050316 A1 | 3/2005 | Peles |
| 2005/0055578 A1 | 3/2005 | Wright et al. |
| 2005/0060427 A1 | 3/2005 | Phillips et al. |
| 2005/0066196 A1 | 3/2005 | Yagi |
| 2005/0086255 A1 | 4/2005 | Schran et al. |
| 2005/0091341 A1 | 4/2005 | Knight et al. |
| 2005/0091357 A1 | 4/2005 | Krantz et al. |
| 2005/0100000 A1 | 5/2005 | Faulkner et al. |
| 2005/0111367 A1 | 5/2005 | Jonathan Chao et al. |
| 2005/0125553 A1 | 6/2005 | Wu et al. |
| 2005/0125684 A1 | 6/2005 | Schmidt |
| 2005/0182833 A1 | 8/2005 | Duffie, III et al. |
| 2005/0193245 A1 | 9/2005 | Hayden et al. |
| 2005/0201363 A1 | 9/2005 | Gilchrist et al. |
| 2005/0210242 A1 | 9/2005 | Troxel et al. |
| 2005/0234920 A1 | 10/2005 | Rhodes |
| 2005/0251009 A1 | 11/2005 | Morita et al. |
| 2005/0262237 A1 | 11/2005 | Fulton et al. |
| 2005/0270975 A1 | 12/2005 | Meylan et al. |
| 2006/0029096 A1 | 2/2006 | Babbar et al. |

(56) References Cited

U.S. PATENT DOCUMENTS

| | | |
|---|---|---|
| 2006/0045016 A1 | 3/2006 | Dawdy et al. |
| 2006/0045017 A1 | 3/2006 | Yamasaki |
| 2006/0075358 A1 | 4/2006 | Ahokas |
| 2006/0085526 A1 | 4/2006 | Gulland |
| 2006/0101068 A1 | 5/2006 | Stuhec et al. |
| 2006/0106743 A1 | 5/2006 | Horvitz |
| 2006/0123477 A1 | 6/2006 | Raghavan et al. |
| 2006/0171333 A1 | 8/2006 | Shimada et al. |
| 2006/0174343 A1 | 8/2006 | Duthie et al. |
| 2006/0184535 A1 | 8/2006 | Kaluskar et al. |
| 2006/0188494 A1 | 8/2006 | Bach et al. |
| 2006/0191008 A1 | 8/2006 | Fernando et al. |
| 2006/0191009 A1 | 8/2006 | Ito et al. |
| 2006/0200572 A1 | 9/2006 | Schcolnik |
| 2006/0230452 A1 | 10/2006 | Field |
| 2006/0230456 A1 | 10/2006 | Nagabhushan et al. |
| 2006/0233349 A1 | 10/2006 | Cooper |
| 2007/0039051 A1 | 2/2007 | Duthie et al. |
| 2007/0043861 A1 | 2/2007 | Baron et al. |
| 2007/0067841 A1 | 3/2007 | Yegneswaran et al. |
| 2007/0077931 A1 | 4/2007 | Glinka |
| 2007/0088845 A1 | 4/2007 | Memon et al. |
| 2007/0110053 A1 | 5/2007 | Soni et al. |
| 2007/0143852 A1 | 6/2007 | Keanini et al. |
| 2007/0153689 A1 | 7/2007 | Strub et al. |
| 2007/0156886 A1 | 7/2007 | Srivastava |
| 2007/0156919 A1 | 7/2007 | Potti et al. |
| 2007/0157306 A1 | 7/2007 | Elrod et al. |
| 2007/0169190 A1 | 7/2007 | Kolton et al. |
| 2007/0188494 A1 | 8/2007 | Agutter et al. |
| 2007/0192863 A1 | 8/2007 | Kapoor et al. |
| 2007/0211625 A1 | 9/2007 | Liu et al. |
| 2007/0239639 A1 | 10/2007 | Loughmiller et al. |
| 2007/0245420 A1 | 10/2007 | Yong et al. |
| 2007/0256122 A1 | 11/2007 | Foo et al. |
| 2008/0022401 A1 | 1/2008 | Cameron et al. |
| 2008/0031141 A1 | 2/2008 | Lean et al. |
| 2008/0034424 A1 | 2/2008 | Overcash et al. |
| 2008/0034425 A1 | 2/2008 | Overcash et al. |
| 2008/0059582 A1 | 3/2008 | Hartikainen et al. |
| 2008/0062995 A1 | 3/2008 | Kaas et al. |
| 2008/0069002 A1 | 3/2008 | Savoor et al. |
| 2008/0103610 A1 | 5/2008 | Ebrom et al. |
| 2008/0130645 A1 | 6/2008 | Deshpande et al. |
| 2008/0130659 A1 | 6/2008 | Polland |
| 2008/0133517 A1 | 6/2008 | Kapoor et al. |
| 2008/0133518 A1 | 6/2008 | Kapoor et al. |
| 2008/0134330 A1 | 6/2008 | Kapoor et al. |
| 2008/0141275 A1 | 6/2008 | Borgendale et al. |
| 2008/0141374 A1 | 6/2008 | Sidiroglou et al. |
| 2008/0147818 A1 | 6/2008 | Sabo |
| 2008/0162390 A1 | 7/2008 | Kapoor et al. |
| 2008/0172416 A1 | 7/2008 | Ito |
| 2008/0212586 A1 | 9/2008 | Wang et al. |
| 2008/0219261 A1 | 9/2008 | Lin et al. |
| 2008/0222717 A1 | 9/2008 | Rothstein et al. |
| 2008/0225740 A1 | 9/2008 | Martin et al. |
| 2008/0232359 A1 | 9/2008 | Kim et al. |
| 2008/0279111 A1 | 11/2008 | Atkins et al. |
| 2008/0282080 A1 | 11/2008 | Hyndman et al. |
| 2008/0294384 A1 | 11/2008 | Fok et al. |
| 2008/0307219 A1 | 12/2008 | Karandikar |
| 2008/0320297 A1* | 12/2008 | Sabo .............. H04L 9/0825 726/14 |
| 2009/0010259 A1 | 1/2009 | Sirotkin |
| 2009/0034426 A1 | 2/2009 | Luft et al. |
| 2009/0063665 A1 | 3/2009 | Bagepalli et al. |
| 2009/0089326 A1 | 4/2009 | Balasubramanian |
| 2009/0109973 A1 | 4/2009 | Ilnicki |
| 2009/0168657 A1 | 7/2009 | Puri et al. |
| 2009/0187653 A1 | 7/2009 | Fu et al. |
| 2009/0220080 A1* | 9/2009 | Herne .............. H04L 9/0827 380/255 |
| 2009/0225675 A1 | 9/2009 | Baum et al. |
| 2009/0228330 A1 | 9/2009 | Karras et al. |
| 2009/0245083 A1 | 10/2009 | Hamzeh |
| 2009/0265344 A1 | 10/2009 | Etoh et al. |
| 2009/0268605 A1 | 10/2009 | Campbell et al. |
| 2009/0271469 A1 | 10/2009 | Benco et al. |
| 2009/0292954 A1 | 11/2009 | Jiang et al. |
| 2009/0296593 A1 | 12/2009 | Prescott |
| 2009/0316602 A1 | 12/2009 | Nandy et al. |
| 2009/0319773 A1 | 12/2009 | Frenkel et al. |
| 2009/0320138 A1 | 12/2009 | Keanini et al. |
| 2009/0327695 A1 | 12/2009 | Molsberry et al. |
| 2009/0328219 A1 | 12/2009 | Narayanaswamy |
| 2010/0027432 A1 | 2/2010 | Gopalan et al. |
| 2010/0091770 A1 | 4/2010 | Ishikawa |
| 2010/0095367 A1 | 4/2010 | Narayanaswamy |
| 2010/0131755 A1 | 5/2010 | Zhu et al. |
| 2010/0135498 A1 | 6/2010 | Long et al. |
| 2010/0167713 A1 | 7/2010 | Hoffman |
| 2010/0191856 A1 | 7/2010 | Gupta et al. |
| 2010/0192225 A1 | 7/2010 | Ma et al. |
| 2010/0201573 A1 | 8/2010 | Lamming |
| 2010/0226301 A1 | 9/2010 | Lohmar et al. |
| 2010/0250918 A1 | 9/2010 | Tremblay et al. |
| 2010/0250928 A1 | 9/2010 | Goto |
| 2010/0268937 A1 | 10/2010 | Blom et al. |
| 2010/0278056 A1 | 11/2010 | Meloche et al. |
| 2010/0281539 A1 | 11/2010 | Burns et al. |
| 2010/0299158 A1 | 11/2010 | Siegel |
| 2010/0316216 A1 | 12/2010 | Fukushima et al. |
| 2010/0322248 A1 | 12/2010 | Ivanov |
| 2010/0332618 A1 | 12/2010 | Norton et al. |
| 2011/0019574 A1 | 1/2011 | Malomsoky et al. |
| 2011/0055138 A1 | 3/2011 | Khanduja et al. |
| 2011/0122792 A1 | 5/2011 | Duffield et al. |
| 2011/0126259 A1 | 5/2011 | Krishnamurthi et al. |
| 2011/0126275 A1 | 5/2011 | Anderson et al. |
| 2011/0150220 A1 | 6/2011 | Breton et al. |
| 2011/0173441 A1 | 7/2011 | Bagepalli et al. |
| 2011/0173490 A1 | 7/2011 | Narayanaswamy et al. |
| 2011/0197276 A1 | 8/2011 | Dorrendorf et al. |
| 2011/0231652 A1 | 9/2011 | Bollay et al. |
| 2011/0280149 A1 | 11/2011 | Okada et al. |
| 2011/0296002 A1 | 12/2011 | Caram |
| 2011/0320394 A1 | 12/2011 | McKeown et al. |
| 2011/0321160 A1 | 12/2011 | Mohandas et al. |
| 2012/0016977 A1 | 1/2012 | Robertson et al. |
| 2012/0030731 A1 | 2/2012 | Bhargava et al. |
| 2012/0084838 A1 | 4/2012 | Inforzato et al. |
| 2012/0130745 A1 | 5/2012 | Jones |
| 2012/0131330 A1 | 5/2012 | Tönsing et al. |
| 2012/0166962 A1 | 6/2012 | Lunsford |
| 2012/0176917 A1 | 7/2012 | Matityahu et al. |
| 2012/0210385 A1 | 8/2012 | Cirstea et al. |
| 2012/0215328 A1 | 8/2012 | Schmelzer |
| 2012/0216282 A1 | 8/2012 | Pappu et al. |
| 2012/0233694 A1 | 9/2012 | Baliga et al. |
| 2012/0243533 A1 | 9/2012 | Leong |
| 2012/0266209 A1 | 10/2012 | Gooding et al. |
| 2012/0278477 A1 | 11/2012 | Terrell et al. |
| 2012/0278625 A1 | 11/2012 | Narayanan et al. |
| 2012/0278890 A1 | 11/2012 | Määttä et al. |
| 2012/0284791 A1 | 11/2012 | Miller et al. |
| 2012/0290711 A1 | 11/2012 | Upham et al. |
| 2012/0294305 A1 | 11/2012 | Rose et al. |
| 2012/0324585 A1 | 12/2012 | Beckett, III et al. |
| 2013/0007296 A1 | 1/2013 | Mukherjee et al. |
| 2013/0010600 A1 | 1/2013 | Jocha et al. |
| 2013/0010608 A1 | 1/2013 | Ramachandran et al. |
| 2013/0042323 A1 | 2/2013 | Narayanaswamy et al. |
| 2013/0061036 A1 | 3/2013 | Oliver |
| 2013/0064084 A1 | 3/2013 | Babbar et al. |
| 2013/0067034 A1 | 3/2013 | Degioanni et al. |
| 2013/0097203 A1 | 4/2013 | Bhattacharjee et al. |
| 2013/0103734 A1 | 4/2013 | Boldyrev et al. |
| 2013/0111543 A1 | 5/2013 | Brown et al. |
| 2013/0133032 A1 | 5/2013 | Li et al. |
| 2013/0166730 A1 | 6/2013 | Wilkinson |
| 2013/0176842 A1 | 7/2013 | Bauchot et al. |
| 2013/0188645 A1 | 7/2013 | Mack-Crane |
| 2013/0198512 A1 | 8/2013 | Rubin et al. |

(56) References Cited

U.S. PATENT DOCUMENTS

| | | |
|---|---|---|
| 2013/0198827 A1 | 8/2013 | Bhaskaran et al. |
| 2013/0212297 A1 | 8/2013 | Varga |
| 2013/0227259 A1 | 8/2013 | Kim |
| 2013/0232104 A1 | 9/2013 | Goyal et al. |
| 2013/0262655 A1 | 10/2013 | Deschênes et al. |
| 2013/0291107 A1 | 10/2013 | Marck et al. |
| 2013/0305357 A1 | 11/2013 | Ayyagari et al. |
| 2013/0305392 A1 | 11/2013 | Bar-El et al. |
| 2013/0339514 A1 | 12/2013 | Crank et al. |
| 2013/0347018 A1 | 12/2013 | Limp et al. |
| 2014/0020067 A1 | 1/2014 | Kim et al. |
| 2014/0026193 A1 | 1/2014 | Saxman et al. |
| 2014/0040451 A1 | 2/2014 | Agrawal et al. |
| 2014/0068035 A1 | 3/2014 | Croy et al. |
| 2014/0075536 A1 | 3/2014 | Davis et al. |
| 2014/0077956 A1 | 3/2014 | Sampath et al. |
| 2014/0109168 A1 | 4/2014 | Ashley et al. |
| 2014/0149456 A1 | 5/2014 | Carr et al. |
| 2014/0164584 A1 | 6/2014 | Joe et al. |
| 2014/0165207 A1 | 6/2014 | Engel et al. |
| 2014/0189093 A1 | 7/2014 | du Toit et al. |
| 2014/0195797 A1 | 7/2014 | du Toit |
| 2014/0201838 A1 | 7/2014 | Varsanyi et al. |
| 2014/0222998 A1 | 8/2014 | Vasseur et al. |
| 2014/0223325 A1 | 8/2014 | Melendez et al. |
| 2014/0241164 A1 | 8/2014 | Cociglio et al. |
| 2014/0242972 A1 | 8/2014 | Slotznick |
| 2014/0258511 A1 | 9/2014 | Sima et al. |
| 2014/0269777 A1* | 9/2014 | Rothstein ............ H04L 63/0428 370/503 |
| 2014/0304211 A1 | 10/2014 | Horvitz |
| 2014/0304339 A1 | 10/2014 | Hamilton |
| 2014/0310392 A1 | 10/2014 | Ho |
| 2014/0317288 A1 | 10/2014 | Krueger et al. |
| 2014/0344633 A1 | 11/2014 | Li et al. |
| 2014/0351415 A1 | 11/2014 | Harrigan et al. |
| 2015/0006896 A1 | 1/2015 | Franck |
| 2015/0007314 A1 | 1/2015 | Vaughan |
| 2015/0007316 A1 | 1/2015 | Ben-Shalom et al. |
| 2015/0023168 A1 | 1/2015 | Kotecha et al. |
| 2015/0026027 A1 | 1/2015 | Priess et al. |
| 2015/0058987 A1 | 2/2015 | Thure et al. |
| 2015/0063158 A1 | 3/2015 | Nedeltchev et al. |
| 2015/0074258 A1 | 3/2015 | Ferreira et al. |
| 2015/0074462 A1 | 3/2015 | Jacoby |
| 2015/0089034 A1 | 3/2015 | Stickle et al. |
| 2015/0096022 A1 | 4/2015 | Vincent et al. |
| 2015/0100780 A1 | 4/2015 | Rubin et al. |
| 2015/0106616 A1 | 4/2015 | Nix |
| 2015/0106930 A1 | 4/2015 | Honda et al. |
| 2015/0113588 A1 | 4/2015 | Wing et al. |
| 2015/0121461 A1 | 4/2015 | Dulkin et al. |
| 2015/0134554 A1 | 5/2015 | Clais et al. |
| 2015/0134776 A1 | 5/2015 | Kruglick |
| 2015/0149828 A1 | 5/2015 | Mukerji et al. |
| 2015/0180759 A1 | 6/2015 | Fallon |
| 2015/0180890 A1 | 6/2015 | Ronen et al. |
| 2015/0188702 A1 | 7/2015 | Men et al. |
| 2015/0199613 A1 | 7/2015 | Ruiz et al. |
| 2015/0227859 A1 | 8/2015 | Ames, II |
| 2015/0229661 A1 | 8/2015 | Balabine et al. |
| 2015/0242627 A1 | 8/2015 | Lee et al. |
| 2015/0249512 A1 | 9/2015 | Adimatyam et al. |
| 2015/0269358 A1 | 9/2015 | Hesketh et al. |
| 2015/0277802 A1 | 10/2015 | Oikarinen et al. |
| 2015/0304350 A1 | 10/2015 | Lin |
| 2015/0331771 A1 | 11/2015 | Conway |
| 2015/0341379 A1 | 11/2015 | Lefebvre et al. |
| 2015/0350167 A1 | 12/2015 | Djakovic |
| 2015/0365438 A1 | 12/2015 | Carver et al. |
| 2016/0006766 A1 | 1/2016 | Joo |
| 2016/0026922 A1 | 1/2016 | Vasseur et al. |
| 2016/0028755 A1 | 1/2016 | Vasseur et al. |
| 2016/0036647 A1 | 2/2016 | Gonzalez et al. |
| 2016/0043919 A1 | 2/2016 | Connelly et al. |
| 2016/0055335 A1 | 2/2016 | Herwono et al. |
| 2016/0056959 A1 | 2/2016 | Blom et al. |
| 2016/0080236 A1 | 3/2016 | Nikolaev et al. |
| 2016/0093205 A1 | 3/2016 | Boyer |
| 2016/0119215 A1 | 4/2016 | Deschênes et al. |
| 2016/0127401 A1 | 5/2016 | Chauhan et al. |
| 2016/0134659 A1 | 5/2016 | Reddy et al. |
| 2016/0142435 A1 | 5/2016 | Bernstein et al. |
| 2016/0173288 A1 | 6/2016 | Li et al. |
| 2016/0173556 A1 | 6/2016 | Park et al. |
| 2016/0182274 A1 | 6/2016 | Kiesekamp et al. |
| 2016/0197949 A1 | 7/2016 | Nyhuis et al. |
| 2016/0219066 A1 | 7/2016 | Vasseur et al. |
| 2016/0226913 A1 | 8/2016 | Sood et al. |
| 2016/0241574 A1 | 8/2016 | Kumar et al. |
| 2016/0262044 A1 | 9/2016 | Calin et al. |
| 2016/0285752 A1 | 9/2016 | Joshi |
| 2016/0294870 A1 | 10/2016 | Banerjee et al. |
| 2016/0301624 A1 | 10/2016 | Gonzalez et al. |
| 2016/0301709 A1 | 10/2016 | Hassanzadeh et al. |
| 2016/0308725 A1 | 10/2016 | Tang et al. |
| 2016/0337312 A1 | 11/2016 | Buchanan et al. |
| 2016/0352761 A1 | 12/2016 | McGrew et al. |
| 2016/0357964 A1 | 12/2016 | Mulchandani |
| 2016/0357967 A1 | 12/2016 | Mulchandani |
| 2016/0359872 A1 | 12/2016 | Yadav et al. |
| 2016/0359915 A1 | 12/2016 | Gupta et al. |
| 2016/0366020 A1 | 12/2016 | Ramachandran et al. |
| 2016/0366186 A1 | 12/2016 | Kamble |
| 2016/0373414 A1 | 12/2016 | MacCarthaigh |
| 2016/0380885 A1 | 12/2016 | Jani et al. |
| 2017/0012836 A1 | 1/2017 | Tongaonkar et al. |
| 2017/0041296 A1 | 2/2017 | Ford et al. |
| 2017/0048109 A1 | 2/2017 | Kant et al. |
| 2017/0070416 A1 | 3/2017 | Narayanan et al. |
| 2017/0076206 A1 | 3/2017 | Lastras-Montano et al. |
| 2017/0085590 A1 | 3/2017 | Hsu et al. |
| 2017/0090906 A1 | 3/2017 | Reynolds |
| 2017/0093796 A1 | 3/2017 | Wang et al. |
| 2017/0093891 A1 | 3/2017 | Mitchell |
| 2017/0093897 A1 | 3/2017 | Cochin et al. |
| 2017/0097982 A1 | 4/2017 | Zhang et al. |
| 2017/0099196 A1 | 4/2017 | Barsheshet et al. |
| 2017/0111272 A1 | 4/2017 | Liu et al. |
| 2017/0118092 A1 | 4/2017 | Dixon et al. |
| 2017/0123886 A1 | 5/2017 | Vaideeswaran |
| 2017/0126472 A1 | 5/2017 | Margalit et al. |
| 2017/0126709 A1 | 5/2017 | Baradaran et al. |
| 2017/0134937 A1 | 5/2017 | Miller et al. |
| 2017/0195353 A1 | 7/2017 | Taylor et al. |
| 2017/0230270 A1 | 8/2017 | Padinhakara et al. |
| 2017/0230417 A1 | 8/2017 | Amar et al. |
| 2017/0270105 A1 | 9/2017 | Ninan et al. |
| 2017/0279837 A1 | 9/2017 | Dasgupta et al. |
| 2017/0279838 A1 | 9/2017 | Dasgupta et al. |
| 2017/0279839 A1 | 9/2017 | Vasseur et al. |
| 2017/0288974 A1 | 10/2017 | Yoshihira et al. |
| 2017/0288987 A1 | 10/2017 | Pasupathy et al. |
| 2017/0289104 A1 | 10/2017 | Shankar et al. |
| 2017/0289168 A1 | 10/2017 | Bar et al. |
| 2017/0289185 A1 | 10/2017 | Mandyam |
| 2017/0289847 A1 | 10/2017 | Wetterwald et al. |
| 2017/0310703 A1 | 10/2017 | Ackerman et al. |
| 2017/0317941 A1 | 11/2017 | Eggleston et al. |
| 2017/0324758 A1 | 11/2017 | Hart et al. |
| 2017/0353437 A1 | 12/2017 | Ayyadevara et al. |
| 2017/0353477 A1 | 12/2017 | Faigon et al. |
| 2017/0364794 A1 | 12/2017 | Mahkonen et al. |
| 2017/0366526 A1 | 12/2017 | Wood et al. |
| 2018/0007087 A1 | 1/2018 | Grady et al. |
| 2018/0013650 A1 | 1/2018 | Khanal et al. |
| 2018/0033089 A1 | 2/2018 | Goldman et al. |
| 2018/0075240 A1 | 3/2018 | Chen |
| 2018/0084011 A1 | 3/2018 | Joseph et al. |
| 2018/0091413 A1 | 3/2018 | Richards et al. |
| 2018/0091534 A1 | 3/2018 | Dubrovsky et al. |
| 2018/0103056 A1 | 4/2018 | Kohout et al. |
| 2018/0109507 A1 | 4/2018 | Caldera et al. |
| 2018/0109557 A1 | 4/2018 | Yoo et al. |

(56) References Cited

U.S. PATENT DOCUMENTS

| | | |
|---|---|---|
| 2018/0115566 A1 | 4/2018 | Azvine et al. |
| 2018/0131675 A1 | 5/2018 | Sengupta et al. |
| 2018/0131711 A1 | 5/2018 | Chen et al. |
| 2018/0137001 A1 | 5/2018 | Zong et al. |
| 2018/0139227 A1 | 5/2018 | Martin et al. |
| 2018/0167310 A1 | 6/2018 | Kamble |
| 2018/0191755 A1 | 7/2018 | Monaco et al. |
| 2018/0198812 A1 | 7/2018 | Christodorescu et al. |
| 2018/0219879 A1 | 8/2018 | Pierce |
| 2018/0260715 A1 | 9/2018 | Yan et al. |
| 2018/0262487 A1 | 9/2018 | Zaifman et al. |
| 2018/0276561 A1 | 9/2018 | Pasternack et al. |
| 2018/0351781 A1 | 12/2018 | Movsisyan et al. |
| 2018/0351970 A1 | 12/2018 | Majumder et al. |
| 2018/0375882 A1 | 12/2018 | Kallos et al. |
| 2018/0375893 A1 | 12/2018 | Jordan et al. |
| 2019/0005205 A1 | 1/2019 | Dargar et al. |
| 2019/0007283 A1 | 1/2019 | Kieviet et al. |
| 2019/0012441 A1 | 1/2019 | Tuli et al. |
| 2019/0028357 A1 | 1/2019 | Kokkula et al. |
| 2019/0052554 A1 | 2/2019 | Mukerji et al. |
| 2019/0052675 A1 | 2/2019 | Krebs |
| 2019/0068465 A1 | 2/2019 | Khanal et al. |
| 2019/0079979 A1 | 3/2019 | Chan |
| 2019/0095478 A1 | 3/2019 | Tankersley et al. |
| 2019/0102469 A1 | 4/2019 | Makovsky et al. |
| 2019/0121979 A1 | 4/2019 | Chari et al. |
| 2019/0132359 A1 | 5/2019 | Kraenzel et al. |
| 2019/0163678 A1 | 5/2019 | Bath et al. |
| 2019/0171725 A1 | 6/2019 | Shen et al. |
| 2019/0196912 A1 | 6/2019 | Didehban et al. |
| 2019/0230095 A1 | 7/2019 | McGrew et al. |
| 2019/0236149 A1 | 8/2019 | Kuruvada et al. |
| 2019/0245734 A1 | 8/2019 | Wu et al. |
| 2019/0245763 A1 | 8/2019 | Wu et al. |
| 2019/0266999 A1 | 8/2019 | Chandrasekaran et al. |
| 2019/0303198 A1 | 10/2019 | Kim et al. |
| 2019/0340554 A1 | 11/2019 | Dotan-Cohen et al. |
| 2019/0372828 A1 | 12/2019 | Wu et al. |
| 2019/0387005 A1 | 12/2019 | Zawoad et al. |
| 2020/0034528 A1 | 1/2020 | Yang et al. |
| 2020/0067952 A1 | 2/2020 | Deaguero et al. |
| 2020/0082081 A1 | 3/2020 | Sarin et al. |
| 2020/0099703 A1 | 3/2020 | Singh |
| 2020/0220849 A1 | 7/2020 | Zaifman et al. |
| 2020/0236131 A1 | 7/2020 | Vejman et al. |
| 2020/0287885 A1 | 9/2020 | Rodniansky |
| 2020/0321087 A1 | 10/2020 | Willis et al. |
| 2020/0389469 A1 | 12/2020 | Litichever et al. |
| 2021/0006589 A1 | 1/2021 | Kohout et al. |
| 2021/0185087 A1 | 6/2021 | Wu et al. |
| 2021/0218714 A1* | 7/2021 | Wang .............. H04L 63/166 |
| 2021/0250368 A1 | 8/2021 | Hearty et al. |
| 2021/0288993 A1 | 9/2021 | Kraning et al. |
| 2021/0360004 A1 | 11/2021 | McGrew et al. |
| 2021/0360011 A1 | 11/2021 | O'Hara et al. |
| 2022/0019688 A1 | 1/2022 | Nelluri et al. |
| 2022/0070188 A1 | 3/2022 | Sheedy et al. |
| 2022/0224716 A1 | 7/2022 | Salji |

FOREIGN PATENT DOCUMENTS

| | | | | |
|---|---|---|---|---|
| CN | 105071987 A | | 11/2015 | |
| CN | 105323247 A | | 2/2016 | |
| CN | 106170008 A | | 11/2016 | |
| CN | 106341375 A | * | 1/2017 | ......... H04L 63/0428 |
| CN | 107646190 A | | 1/2018 | |
| CN | 107667510 A | | 2/2018 | |
| CN | 106533665 B | * | 8/2018 | ......... H04L 63/0435 |
| CN | 109104441 A | | 12/2018 | |
| CN | 109542772 A1 | | 3/2019 | |
| CN | 110113349 A | | 8/2019 | |
| CN | 107667510 B | | 11/2020 | |
| CN | 112085039 A | | 12/2020 | |
| CN | 112398876 A | | 2/2021 | |
| CN | 107646190 B | | 3/2021 | |
| DE | 69533953 T2 | | 4/2006 | |
| EP | 0702477 A2 | | 3/1996 | |
| EP | 0702477 A3 | | 7/1999 | |
| EP | 1026867 A2 | | 8/2000 | |
| EP | 0702477 B1 | | 1/2005 | |
| EP | 1579629 A2 | | 9/2005 | |
| EP | 2057576 A2 | | 5/2009 | |
| EP | 1579629 A4 | | 11/2009 | |
| EP | 2215801 B1 | | 4/2011 | |
| EP | 2057576 A4 | | 4/2012 | |
| EP | 3094061 A1 | | 11/2016 | |
| EP | 3113443 A1 | | 1/2017 | |
| EP | 3306890 A1 | | 4/2018 | |
| EP | 3394784 B1 | | 10/2020 | |
| EP | 3272095 B1 | | 3/2021 | |
| FR | 2924552 A1 | | 6/2009 | |
| GB | 2545910 A | | 7/2017 | |
| GB | 2545910 B | | 2/2018 | |
| KR | 960012819 A | | 4/1996 | |
| KR | 100388606 B1 | | 11/2003 | |
| KR | 20140093060 A | | 7/2014 | |
| KR | 101662614 B1 | | 10/2016 | |
| NZ | 586270 A | | 12/2011 | |
| WO | 2004040423 A2 | | 5/2004 | |
| WO | 2004040423 A3 | | 5/2004 | |
| WO | 2008026212 A2 | | 3/2008 | |
| WO | 2008026212 A3 | | 3/2008 | |
| WO | 2009015461 A1 | | 2/2009 | |
| WO | 2009068603 A2 | | 6/2009 | |
| WO | 2015128613 A1 | | 9/2015 | |
| WO | 2016118131 A1 | | 7/2016 | |
| WO | 2016144932 A1 | | 9/2016 | |
| WO | 2016146610 A1 | | 9/2016 | |
| WO | 3089424 A1 | | 11/2016 | |
| WO | 2016191486 A1 | | 12/2016 | |
| WO | 2017108575 A1 | | 6/2017 | |
| WO | 2017108576 A1 | | 6/2017 | |
| WO | WO-2020131740 A1 | * | 6/2020 | ......... H04L 63/0428 |

OTHER PUBLICATIONS

Office Communication for U.S. Appl. No. 17/483,435 dated Nov. 30, 2021, pp. 1-21.

Office Communication for U.S. Appl. No. 17/483,148 dated Dec. 13, 2021, pp. 1-28.

Office Communication for U.S. Appl. No. 16/813,649 dated Dec. 20, 2021, pp. 1-44.

Office Communication for U.S. Appl. No. 17/226,947 dated Dec. 30, 2021, pp. 1-6.

Office Communication for U.S. Appl. No. 16/820,582 dated Jan. 14, 2022, pp. 1-13.

Office Communication for U.S. Appl. No. 16/989,025 dated Jan. 19, 2022, pp. 1-12.

Supplementary European Search Report for European Patent Application No. 19804040.4 dated Jan. 25, 2022, pp. 1-4.

Office Communication for U.S. Appl. No. 17/351,866 dated Feb. 9, 2022, pp. 1-9.

International Search Report and Written Opinion for International Patent Application No. PCT/US2021/051757 dated Jan. 11, 2022, pp. 1-9.

"Kerberos Overview—An Authentication Service for Open Network Systems," Cisco Systems, Inc., Jan. 19, 2006, https://www.cisco.com/c/en/us/support/docs/security-vpn/kerberos/16087-1.html, Accessed: Feb. 9, 2022, pp. 1-16.

Office Communication for U.S. Appl. No. 17/337,299 dated Feb. 17, 2022, pp. 1-14.

Office Communication for U.S. Appl. No. 16/679,055 dated Mar. 2, 2022, pp. 1-35.

Office Communication for U.S. Appl. No. 15/585,887 dated Mar. 24, 2022, pp. 1-40.

Office Communication for U.S. Appl. No. 17/318,423 dated Mar. 29, 2022, pp. 1-21.

Office Communication for U.S. Appl. No. 16/989,343 dated Mar. 29, 2022, pp. 1-5.

(56) References Cited

OTHER PUBLICATIONS

Office Communication for U.S. Appl. No. 16/813,649 dated Apr. 1, 2022, pp. 1-4.
Office Communication for U.S. Appl. No. 13/831,673 dated Sep. 30, 2013, pp. 1-10.
Office Communication for U.S. Appl. No. 13/831,673 dated Mar. 6, 2014, pp. 1-12.
Office Communication for U.S. Appl. No. 13/831,673 dated May 22, 2014, pp. 1-5.
Office Communication for U.S. Appl. No. 13/831,626 dated Sep. 3, 2013, pp. 1-17.
Office Communication for U.S. Appl. No. 13/831,959 dated Aug. 22, 2013, pp. 1-9.
Handel, Theodore G. et al., "Hiding data in the OSI network model." In: Anderson R. (eds) Information Hiding. IH 1996. Lecture Notes in Computer Science, vol. 1174. Springer, Berlin, Heidelberg. pp. 23-38.
Office Communication for U.S. Appl. No. 14/500,893 dated Nov. 20, 2014, pp. 1-15.
Office Communication for U.S. Appl. No. 14/107,530 dated Mar. 6, 2014, pp. 1-13.
Office Communication for U.S. Appl. No. 14/107,530 dated Sep. 15, 2014, pp. 1-15.
Office Communication for U.S. Appl. No. 13/831,908 dated Aug. 9, 2013, pp. 1-29.
Office Communication for U.S. Appl. No. 13/831,908 dated Jan. 13, 2014, pp. 1-31.
Office Communication for U.S. Appl. No. 13/831,908 dated Apr. 9, 2014, pp. 1-3.
Office Communication for U.S. Appl. No. 13/831,908 dated Jun. 25, 2014, pp. 1-15.
Office Communication for U.S. Appl. No. 14/518,996 dated Nov. 20, 2014, pp. 1-41.
Office Communication for U.S. Appl. No. 14/107,631 dated Feb. 20, 2014, pp. 1-16.
Office Communication for U.S. Appl. No. 14/107,631 dated Sep. 26, 2014, pp. 1-14.
Office Communication for U.S. Appl. No. 14/107,631 dated Dec. 30, 2014, pp. 1-12.
Handley, Mark et al., "Network Intrusion Detection: Evasion, Traffic Normalization, and End-to-End Protocol Semantics," 2011, International Computer Science Institute, pp. 1-17.
Information Sciences Institute, "Internet Protocol Darpa Internet Program Protocol Specification," Sep. 1981, pp. 1-36.
Fuertes, Juan Antonio Cordero, "Evaluation of OSPF Extensions in MANET Routing," Paris, 2007, pp. 1-192.
Parsons, Christopher, "Moving Across the Internet: Code-Bodies, Code-Corpses, and Network Architecture," May 9, 2010, pp. 1-20.
Zander, Sebastian et al., "Covert Channels and Countermeasures in Computer Network Protocols," Dec. 2007, pp. 1-7.
Office Communication for U.S. Appl. No. 14/107,580 dated Mar. 17, 2015, pp. 1-5.
Lin, Mark, "An Overview of Session Hijacking at the Network and Application Levels," Jan. 18, 2005, pp. 1-16.
U.S. Appl. No. 11/683,643, filed Mar. 8, 2007, pp. 1-48.
U.S. Appl. No. 11/679,356, filed Feb. 27, 2007, pp. 1-45.
Office Communication for U.S. Appl. No. 12/326,672 dated Jun. 9, 2010, pp. 1-9.
Office Communication for U.S. Appl. No. 12/326,672 dated Dec. 23, 2010, pp. 1-15.
Office Communication for U.S. Appl. No. 12/326,672 dated Jun. 22, 2011, pp. 1-16.
Office Communication for U.S. Appl. No. 12/326,672 dated Oct. 24, 2011, pp. 1-9.
Office Communication for U.S. Appl. No. 11/683,643 dated Apr. 28, 2010, pp. 1-35.
Office Communication for U.S. Appl. No. 11/683,643 dated Oct. 14, 2010, pp. 1-43.
Office Communication for U.S. Appl. No. 11/683,643 dated Aug. 25, 2011, pp. 1-43.
Office Communication for U.S. Appl. No. 11/683,643 dated Jan. 23, 2012, pp. 1-22.
Office Communication for U.S. Appl. No. 15/014,932 dated Jun. 10, 2016, pp. 1-20.
Office Communication for U.S. Appl. No. 15/207,213 dated Oct. 25, 2016, pp. 1-18.
Office Communication for U.S. Appl. No. 15/014,932 dated Dec. 14, 2016, pp. 1-26.
Digital Imaging and Communications in Medicine (DICOM), Part 6: Data Dictionary, PS 3.6-2011. 2011, http://dicom.nema.org/Dicom/2011 /11_06pu.pdf, pp. 1-216.
Health Level Seven, Version 2.6, Appendix A. Nov. 2007, https://www.hl7.org/special/committees/vocab/V26_Appendix_A.pdf, pp. 1-255.
Office Communication for U.S. Appl. No. 15/207,213 dated Feb. 23, 2017, pp. 1-24.
Office Communication for U.S. Appl. No. 15/014,932 dated Mar. 3, 2017, pp. 1-6.
Office Communication for U.S. Appl. No. 15/207,213 dated May 8, 2017, pp. 1-6.
Office Communication for U.S. Appl. No. 15/207,213 dated Jun. 1, 2017, pp. 1-24.
Office Communication for U.S. Appl. No. 15/014,932 dated Aug. 1, 2017, pp. 1-27.
Office Communication for U.S. Appl. No. 15/690,135 dated Jan. 18, 2018, pp. 1-6.
Office Communication for U.S. Appl. No. 15/891,311 dated Apr. 23, 2018, pp. 1-18.
Office Communication for U.S. Appl. No. 15/892,327 dated Apr. 23, 2018, pp. 1-6.
Office Communication for U.S. Appl. No. 15/014,932 dated May 15, 2018, pp. 1-23.
Office Communication for U.S. Appl. No. 15/891,273 dated Jun. 19, 2018, pp. 1-20.
Office Communication for U.S. Appl. No. 15/014,932 dated Jul. 16, 2018, pp. 1-4.
Office Communication for U.S. Appl. No. 15/690,135 dated May 22, 2018, pp. 1-7.
Office Communication for U.S. Appl. No. 15/984,197 dated Aug. 31, 2018, pp. 1-25.
Office Communication for U.S. Appl. No. 15/891,311 dated Sep. 24, 2018, pp. 1-14.
Office Communication for U.S. Appl. No. 16/048,939 dated Sep. 19, 2018, pp. 1-9.
Office Communication for U.S. Appl. No. 16/113,442 dated Nov. 6, 2018, pp. 1-10.
Office Communication for U.S. Appl. No. 16/100,116 dated Nov. 15, 2018, pp. 1-7.
Office Communication for U.S. Appl. No. 15/014,932 dated Nov. 23, 2018, pp. 1-10.
Office Communication for U.S. Appl. No. 16/107,509 dated Oct. 26, 2018, pp. 1-26.
Office Communication for U.S. Appl. No. 15/891,273 dated Jan. 15, 2019, pp. 1-23.
Office Communication for U.S. Appl. No. 15/891,311 dated Jan. 29, 2019, pp. 1-8.
Office Communication for U.S. Appl. No. 16/174,051 dated Jan. 29, 2019, pp. 1-21.
Office Communication for U.S. Appl. No. 15/671,060 dated May 8, 2019, pp. 1-19.
Office Communication for U.S. Appl. No. 16/113,442 dated Jun. 5, 2019, pp. 1-8.
Office Communication for U.S. Appl. No. 15/891,273 dated May 28, 2019, pp. 1-14.
Office Communication for U.S. Appl. No. 16/107,509 dated Apr. 1, 2019, pp. 1-21.
Office Communication for U.S. Appl. No. 16/048,939 dated Jun. 20, 2019, pp. 1-8.
Office Communication for U.S. Appl. No. 16/100,116 dated May 30, 2019, pp. 1-5.
Office Communication for U.S. Appl. No. 16/384,574 dated May 31, 2019, pp. 1-12.

(56) References Cited

OTHER PUBLICATIONS

Office Communication for U.S. Appl. No. 16/107,509 dated Jun. 14, 2019, pp. 1-5.
Office Communication for U.S. Appl. No. 16/107,509 dated Aug. 21, 2019, pp. 1-25.
Office Communication for U.S. Appl. No. 16/384,574 dated Oct. 8, 2019, pp. 1-13.
Office Communication for U.S. Appl. No. 16/543,243 dated Sep. 27, 2019, pp. 1-24.
Office Communication for U.S. Appl. No. 16/048,939 dated Dec. 5, 2019, pp. 1-9.
Office Communication for U.S. Appl. No. 16/565,109 dated Nov. 27, 2019, pp. 1-18.
Office Communication for U.S. Appl. No. 16/525,290 dated Oct. 31, 2019, pp. 1-9.
Office Communication for U.S. Appl. No. 16/532,275 dated Oct. 24, 2019, pp. 1-29.
Office Communication for U.S. Appl. No. 16/560,886 dated Dec. 6, 2019, pp. 1-17.
Office Communication for U.S. Appl. No. 14/500,893 dated Feb. 18, 2015, pp. 1-11.
Office Communication for U.S. Appl. No. 14/518,996 dated Apr. 20, 2015, pp. 1-37.
Office Communication for U.S. Appl. No. 14/500,893 dated Jun. 15, 2015, pp. 1-12.
Office Communication for U.S. Appl. No. 14/518,996 dated Jul. 21, 2015, pp. 1-17.
Office Communication for U.S. Appl. No. 14/695,690 dated Sep. 9, 2015, pp. 1-41.
Office Communication for U.S. Appl. No. 14/695,690 dated Feb. 24, 2016, pp. 1-11.
Office Communication for U.S. Appl. No. 15/150,354 dated Jul. 5, 2016, pp. 1-18.
Mozilla Developer Network, "NSS Key Log Format," https://developer.mozilla.org/en-US/docs/Mozilla/Projects/NSS/Key_Log_Format, Jan. 8, 2010, p. 1.
Extended European Search Report for European Patent Application No. 16166907.2 dated Sep. 30, 2016, pp. 1-7.
Office Communication for U.S. Appl. No. 15/150,354 dated Feb. 8, 2017, pp. 1-8.
Office Communication for U.S. Appl. No. 15/466,248 dated Jun. 5, 2017, pp. 1-30.
Office Communication for U.S. Appl. No. 15/466,248 dated Oct. 3, 2017, pp. 1-34.
Office Communication for U.S. Appl. No. 15/457,886 dated Jan. 5, 2018, pp. 1-11.
Office Communication for U.S. Appl. No. 15/466,248 dated Jan. 11, 2018, pp. 1-2.
Examination Report for European Patent Application No. 16166907.2 dated Mar. 9, 2018, pp. 1-4.
Shaver, Jim, "Decrypting TLS Browser Traffic with Wireshark the easy way", https://jimshaver.net/2015/02/11/decrypting-tls-browser-traffic-with-wireshark-the-easy-way/, Feb. 11, 2015, pp. 1-30.
Office Communication for U.S. Appl. No. 15/466,248 dated Mar. 8, 2018, pp. 1-34.
Office Communication for U.S. Appl. No. 15/457,886 dated Jul. 18, 2018, pp. 1-11.
Office Communication for U.S. Appl. No. 15/466,248 dated Jul. 11, 2018, pp. 1-31.
International Search Report and Written Opinion for International Patent Application No. PCT/US2017/068585 dated Jul. 4, 2018, pp. 1-11.
Extended European Search Report for European Patent Application No. 17210995.1 dated Jul. 6, 2018, pp. 1-11.
Office Communication for U.S. Appl. No. 15/466,248 dated Oct. 18, 2018, pp. 1-31.
Office Communication for U.S. Appl. No. 15/457,886 dated Mar. 20, 2019, pp. 1-9.
Office Communication for U.S. Appl. No. 15/466,248 dated May 16, 2019, pp. 1-33.
Office Communication for U.S. Appl. No. 15/466,248 dated Sep. 10, 2019, pp. 1-27.
Office Communication for U.S. Appl. No. 15/971,843 dated Oct. 22, 2019, pp. 1-15.
Office Communication for U.S. Appl. No. 14/750,905 dated Sep. 22, 2015, pp. 1-12.
Office Communication for U.S. Appl. No. 14/750,905 dated Jan. 19, 2016, pp. 1-5.
Office Communication for U.S. Appl. No. 15/082,925 dated Sep. 13, 2016, pp. 1-7.
Office Communication for U.S. Appl. No. 15/289,760 dated Dec. 12, 2016, pp. 1-12.
Office Communication for U.S. Appl. No. 15/219,016 dated Nov. 22, 2016, pp. 1-12.
Office Communication for U.S. Appl. No. 15/356,381 dated Jan. 6, 2017, pp. 1-57.
Office Communication for U.S. Appl. No. 15/082,925 dated Feb. 1, 2017, pp. 1-6.
Office Communication for U.S. Appl. No. 15/219,016 dated Mar. 16, 2017, pp. 1-9.
Office Communication for U.S. Appl. No. 15/443,868 dated Apr. 27, 2017, pp. 1-7.
Office Communication for U.S. Appl. No. 15/585,887 dated Jun. 27, 2017, pp. 1-24.
Office Communication for U.S. Appl. No. 15/356,381 dated Jul. 3, 2017, pp. 1-21.
Office Communication for U.S. Appl. No. 15/675,216 dated Jun. 7, 2018, pp. 1-4.
Office Communication for U.S. Appl. No. 15/443,868 dated Aug. 11, 2017, pp. 1-11.
Office Communication for U.S. Appl. No. 15/675,216 dated Nov. 20, 2017, pp. 1-7.
Office Communication for U.S. Appl. No. 15/585,887 dated Nov. 28, 2017, pp. 1-23.
International Search Report and Written Opinion for International Patent Application No. PCT/US2018/030145 dated Aug. 10, 2018, pp. 1-12.
Svoboda, Jakub, "Network Traffic Analysis with Deep Packet Inspection Method," Masaryk University, Faculty of Informatics, Master's Thesis, 2014, pp. 1-74.
International Search Report and Written Opinion for International Patent Application No. PCT/US2017/068586 dated Aug. 9, 2018, pp. 1-14.
Extended European Search Report for European Patent Application No. 17210996.9 dated Jun. 13, 2018, pp. 1-7.
Office Communication for U.S. Appl. No. 15/855,769 dated Feb. 5, 2019, pp. 1-10.
Office Communication for U.S. Appl. No. 15/855,769 dated May 1, 2019, pp. 1-7.
Office Communication for U.S. Appl. No. 16/459,472 dated Aug. 14, 2019, pp. 1-15.
Office Communication for U.S. Appl. No. 15/585,887 dated Mar. 20, 2019, pp. 1-26.
Office Communication for U.S. Appl. No. 15/675,216 dated Aug. 28, 2018, pp. 1-14.
Office Communication for U.S. Appl. No. 15/675,216 dated Jan. 29, 2019, pp. 1-8.
Office Communication for U.S. Appl. No. 16/384,697 dated May 30, 2019, pp. 1-12.
Office Communication for U.S. Appl. No. 16/384,574 dated Jan. 13, 2020, pp. 1-9.
Office Communication for U.S. Appl. No. 16/107,509 dated Jan. 23, 2020, pp. 1-12.
Office Communication for U.S. Appl. No. 15/585,887 dated Jan. 22, 2020, pp. 1-28.
Office Communication for U.S. Appl. No. 16/384,697 dated Oct. 17, 2019, pp. 1-8.
Office Communication for U.S. Appl. No. 16/459,472 dated Feb. 3, 2020, pp. 1-7.
Office Communication for U.S. Appl. No. 16/679,055 dated Feb. 14, 2020, pp. 1-32.
Office Communication for U.S. Appl. No. 16/048,939 dated Feb. 18, 2020, pp. 1-6.

(56) References Cited

OTHER PUBLICATIONS

Office Communication for U.S. Appl. No. 16/424,387 dated Feb. 24, 2020, pp. 1-15.
Office Communication for U.S. Appl. No. 16/718,050 dated Feb. 27, 2020, pp. 1-21.
Wade, Susan Marie, ""Scada Honeynets: The attractiveness of honeypots as critical infrastructure security tools for the detection and analysis of advanced threats"" (2011). Graduate Theses and Dissertations. 12138. https://lib.dr.iastate.edu/std/12138, pp. 1-67.
Office Communication for U.S. Appl. No. 16/525,290 dated Mar. 12, 2020, pp. 1-10.
Office Communication for U.S. Appl. No. 15/971,843 dated Mar. 26, 2020, pp. 1-14.
Office Communication for U.S. Appl. No. 16/048,939 dated Mar. 26, 2020, pp. 1-6.
Office Communication for U.S. Appl. No. 16/543,243 dated Apr. 7, 2020, pp. 1-22.
Office Communication for U.S. Appl. No. 16/532,275 dated Apr. 20, 2020, pp. 1-8.
Office Communication for U.S. Appl. No. 16/560,886 dated Apr. 22, 2020, pp. 1-10.
Office Communication for U.S. Appl. No. 16/565,109 dated May 8, 2020, pp. 1-19.
Examination Report for European Patent Application No. 16166907.2 dated Dec. 19, 2019, pp. 1-6.
Examination Report for European Patent Application No. 17210996.9 dated May 27, 2020, pp. 1-3.
Office Communication for U.S. Appl. No. 15/585,887 dated Aug. 28, 2020, pp. 1-30.
Office Communication for U.S. Appl. No. 16/679,055 dated Sep. 4, 2020, pp. 1-5.
Office Communication for U.S. Appl. No. 16/718,050 dated Sep. 4, 2020, pp. 1-23.
Office Communication for U.S. Appl. No. 16/525,290 dated Sep. 23, 2020, pp. 1-10.
International Search Report and Written Opinion for International Patent Application No. PCT/US2019/030015 dated Aug. 7, 2019, pp. 1-6.
International Search Report and Written Opinion for International Patent Application No. PCT/US2019/018097 dated May 28, 2019, pp. 1-9.
Office Communication for U.S. Appl. No. 15/971,843 dated Oct. 27, 2020, pp. 1-11.
Office Communication for U.S. Appl. No. 16/424,387 dated Nov. 24, 2020, pp. 1-23.
Office Communication for U.S. Appl. No. 16/543,243 dated Dec. 16, 2020, pp. 1-13.
Office Communication for U.S. Appl. No. 16/565,109 dated Jan. 19, 2021, pp. 1-9.
Office Communication for U.S. Appl. No. 16/813,649 dated Feb. 24, 2021, pp. 1-7.
Office Communication for U.S. Appl. No. 16/679,055 dated Mar. 16, 2021, pp. 1-33.
Office Communication for U.S. Appl. No. 15/585,887 dated Mar. 26, 2021, pp. 1-31.
Office Communication for U.S. Appl. No. 16/525,290 dated Mar. 31, 2021, pp. 1-11.
Office Communication for U.S. Appl. No. 15/971,843 dated May 5, 2021, pp. 1-9.
Office Communication for U.S. Appl. No. 16/820,582 dated May 10, 2021, pp. 1-24.
Office Communication for U.S. Appl. No. 16/525,290 dated Jun. 15, 2021, pp. 1-4.
Examination Report for European Patent Application No. 17210996.9 dated May 21, 2021, pp. 1-6.
Office Communication for U.S. Appl. No. 16/525,290 dated Jul. 9, 2021, pp. 1-7.
Office Communication for U.S. Appl. No. 16/679,055 dated Jul. 26, 2021, pp. 1-34.
Office Communication for U.S. Appl. No. 16/718,050 dated Jul. 27, 2021, pp. 1-23.
Office Communication for U.S. Appl. No. 15/971,843 dated Jul. 28, 2021, pp. 1-9.
Office Communication for U.S. Appl. No. 15/585,887 dated Aug. 17, 2021, pp. 1-41.
Office Communication for U.S. Appl. No. 16/820,582 dated Sep. 27, 2021, pp. 1-25.
Office Communication for U.S. Appl. No. 16/679,055 dated Oct. 12, 2021, pp. 1-3.
Office Communication for U.S. Appl. No. 17/351,866 dated Oct. 18, 2021, pp. 1-12.
Office Communication for U.S. Appl. No. 17/337,299 dated Oct. 21, 2021, pp. 1-34.
Office Communication for U.S. Appl. No. 15/585,887 dated Nov. 2, 2021, pp. 1-4.
Extended European Search Report for European Patent Application No. 19846527.0 dated Apr. 4, 2022, pp. 1-9.
Conry-Murray, Andrew, "Security Event Management Gets Specialized," Network Magazine, CMP Media, vol. 20, Nov. 2005, pp. 1-6.
Office Communication for U.S. Appl. No. 16/679,055 dated May 11, 2022, pp. 1-3.
Office Communication for U.S. Appl. No. 16/813,649 dated May 11, 2022, pp. 1-16.
Beckett, David et al., "New Sensing Technique for Detecting Application Layer DDoS Attacks Targeting Back-end Database Resources," IEEE International Conference on Communications (ICC 2017), May 2017, pp. 1-7.
Office Communication for U.S. Appl. No. 16/989,025 dated May 23, 2022, pp. 1-14.
Office Communication for U.S. Appl. No. 16/679,055 dated Jun. 3, 2022, pp. 1-34.
Office Communication for U.S. Appl. No. 17/708,311 dated Jun. 20, 2022, pp. 1-15.
Office Communication for U.S. Appl. No. 17/722,217 dated Jun. 29, 2022, pp. 1-23.
Office Communication for U.S. Appl. No. 17/226,947 dated Jul. 11, 2022, pp. 1-13.
Office Communication for U.S. Appl. No. 17/722,217 dated Jul. 15, 2022, pp. 1-7.
Office Communication for U.S. Appl. No. 17/721,514 dated Jul. 21, 2022, pp. 1-7.
Office Communication for U.S. Appl. No. 16/989,343 dated Aug. 11, 2022, pp. 1-9.
Office Communication for U.S. Appl. No. 16/989,343 dated Aug. 17, 2022, pp. 1-5.
Office Communication for U.S. Appl. No. 15/585,887 dated Sep. 1, 2022, pp. 1-39.
Office Communication for U.S. Appl. No. 17/861,373 dated Sep. 9, 2022, pp. 1-18.
Office Communication for U.S. Appl. No. 17/318,423 dated Sep. 13, 2022, pp. 1-15.
Office Communication for U.S. Appl. No. 17/721,514 dated Sep. 20, 2022, pp. 1-8.
Office Communication for U.S. Appl. No. 16/679,055 dated Sep. 21, 2022, pp. 1-25.
Office Communication for U.S. Appl. No. 17/318,423 dated Sep. 22, 2022, pp. 1-2.
Office Communication for U.S. Appl. No. 16/679,055 dated Sep. 28, 2022, pp. 1-2.
Office Communication for U.S. Appl. No. 17/708,311 dated Oct. 5, 2022, pp. 1-15.
Office Communication for U.S. Appl. No. 17/721,514 dated Oct. 11, 2022, pp. 1-2.
Office Communication for U.S. Appl. No. 17/516,063 dated Oct. 31, 2022, pp. 1-10.
Office Communication for U.S. Appl. No. 17/214,555 dated Nov. 10, 2022, pp. 1-21.
Office Communication for U.S. Appl. No. 15/585,887 dated Nov. 21, 2022, pp. 1-6.
Office Communication for U.S. Appl. No. 17/708,311 dated Dec. 21, 2022, pp. 1-4.

(56) References Cited

OTHER PUBLICATIONS

Office Communication for U.S. Appl. No. 15/585,887 dated Dec. 22, 2022, pp. 1-38.
Office Communication for U.S. Appl. No. 17/861,373 dated Jan. 11, 2023, pp. 1-10.
Office Communication for U.S. Appl. No. 17/861,373 dated Jan. 19, 2023, pp. 1-2.

\* cited by examiner

| FLOW ID | SESSION KEY | CORRELATION INFO | FLOW INFO |
|---|---|---|---|
| 100 | ABCD | AB123D1 | ... |
| 106 | CD1H | CA153A3 | ... |
| 110 | EFDD | FC1A45A1 | ... |

*FIG. 8*

INLINE SECRET SHARING

CROSS-REFERENCE TO RELATED APPLICATION(S)

This Utility patent application is a Continuation of U.S. patent application Ser. No. 15/971,843 filed on May 4, 2018, now U.S. Pat. No. 11,165,831 issued on Nov. 2, 2021, which is a Continuation of U.S. patent application Ser. No. 15/793,880 filed on Oct. 25, 2017, now U.S. Pat. No. 9,967,292 issued on May 8, 2018, the benefit of which is claimed under 35 U.S.C. § 120, and the contents of which are each further incorporated in entirety by reference.

TECHNICAL FIELD

The present invention relates generally to network monitoring, and more particularly, but not exclusively, to monitoring network traffic in a distributed network environment.

BACKGROUND

On most computer networks, bits of data arranged in bytes are packaged into collections called packets. These packets are generally communicated between computing devices over wired or wireless networks. A suite of communication protocols may be employed to communicate between at least two endpoints over one or more networks. One or more protocols may be layered on top of one another to form a protocol stack. One model for a network communication protocol stack is the Open Systems Interconnection (OSI) model, which defines seven layers of different protocols that cooperatively enable communication over a network. The OSI model layers are arranged in the following order: Physical (1), Data Link (2), Network (3), Transport (4), Session (5), Presentation (6), and Application (7).

Another model for a network communication protocol stack is the Internet Protocol (IP) model, which is also known as the Transmission Control Protocol/Internet Protocol (TCP/IP) model. The TCP/IP model is similar to the OSI model except that it defines four layers instead of seven. The TCP/IP model's four layers for network communication protocol are arranged in the following order: Link (1), Internet (2), Transport (3), and Application (4). To reduce the number of layers from four to seven, the TCP/IP model collapses the OSI model's Application, Presentation, and Session layers into its Application layer. Also, the OSI's Physical layer is either assumed or is collapsed into the TCP/IP model's Link layer. Although some communication protocols may be listed at different numbered or named layers of the TCP/IP model versus the OSI model, both of these models describe stacks that include basically the same protocols. For example, the TCP protocol is listed on the fourth layer of the OSI model and on the third layer of the TCP/IP model. To assess and troubleshoot communicated packets and protocols over a network, different types of network monitors can be employed. One type of network monitor, a "packet sniffer" may be employed to generally monitor and record packets of data as they are communicated over a network. Some packet sniffers can display data included in each packet and provide statistics regarding a monitored stream of packets. Also, some types of network monitors are referred to as "protocol analyzers" in part because they can provide additional analysis of monitored and recorded packets regarding a type of network, communication protocol, or application.

Generally, packet sniffers and protocol analyzers passively monitor network traffic without participating in the communication protocols. In some instances, they receive a copy of each packet on a particular network segment or VLAN from one or more members of the network segment. They may receive these packet copies through a port mirror on a managed Ethernet switch, e.g., a Switched Port Analyzer (SPAN) port, a Roving Analysis Port (RAP), or the like, or combinations thereof. Port mirroring enables analysis and debugging of network communications. Port mirroring can be performed for inbound or outbound traffic (or both) on single or multiple interfaces. In other instances, packet copies may be provided to the network monitors from a specialized network tap or from a software agent running on the client or server. In virtual environments, port mirroring may be performed on a virtual switch that is incorporated within the hypervisor.

In some instances, a proxy is actively arranged between two endpoints, such as a client device and a server device. The proxy intercepts each packet sent by each endpoint and optionally transforms and forwards the payload to the other endpoint. Proxies often enable a variety of additional services such as load balancing, caching, content filtering, and access control. In some instances, the proxy may operate as a network monitor. In other instances, the proxy may forward a copy of the packets to a separate network monitor.

In some networks, packet capture devices may be installed. Packet capture devices may be arranged to capture and store network packets for subsequent analysis. However, the sheer amount of data communicated over networks may result in a prohibitively high number of network packets. Accordingly, packets and/or portions of packets may be selectively captured to reduce data storage requirements. In addition, as information technology infrastructure becomes more complex and more dynamic, there may be numerous packet types and formats for the various different types of network protocols and applications that may be carried on modern networks that it difficult for effective network packet capture. Further, many modern networks or networked applications are increasingly using one or more cryptographic protocols to enable secure connections. Secure connections are designed to provide cryptographically secure communication. In some cases, the cryptographically secure communication may interfere with network monitoring. Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein:

FIG. 8 illustrates a logical representation of a table data structure that a NMC may employ to associate session keys or other key information with particular secure communication sessions, secure connections, or network flows in accordance with one or more of various embodiments;

DETAILED DESCRIPTION OF THE INVENTION

Figure 1:
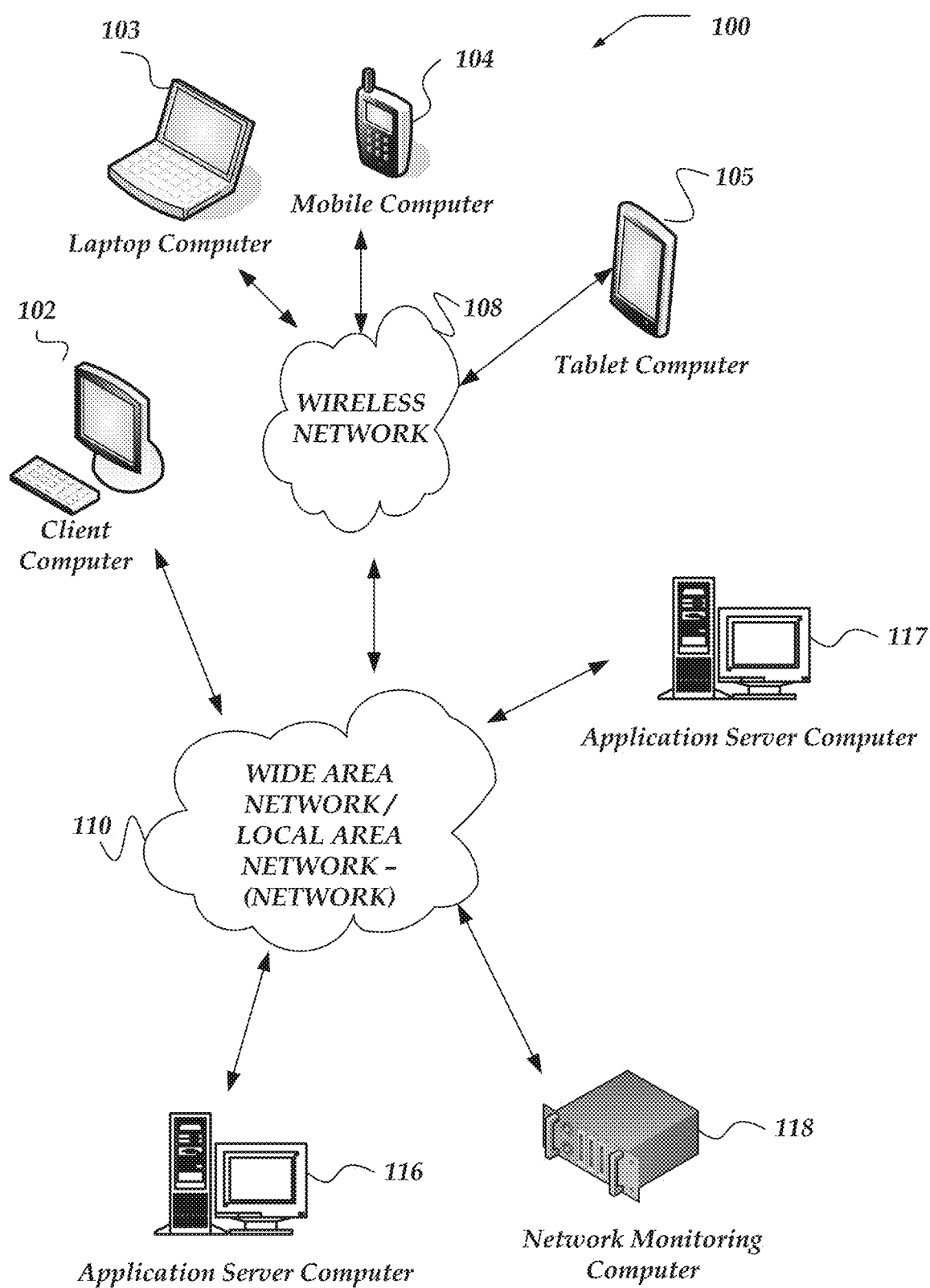
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the innovations may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. Also, throughout the specification and the claims, the use of "when" and "responsive to" do not imply that associated resultant actions are required to occur immediately or within a particular time period. Instead they are used herein to indicate actions that may occur or be performed in response to one or more conditions being met, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, PHP, Perl, JavaScript, Ruby, VBScript, Microsoft .NET™ languages such as C#, and/or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine.

As used herein, the term "session" refers to a semi-permanent interactive packet interchange between two or more communicating endpoints, such as network devices. A session is set up or established at a certain point in time, and torn down at a later point in time. An established communication session may involve more than one message in each direction. A session may have stateful communication where at least one of the communicating network devices saves information about the session history to be able to communicate. A session may also provide stateless communication, where the communication consists of independent requests with responses between the endpoints. An established session is the basic requirement to perform a connection-oriented communication. A session also is the basic step to transmit in connectionless communication modes.

As used herein, the terms "network connection," and "connection" refer to communication sessions with a semi-permanent connection for interactive packet interchange between two or more communicating endpoints, such as network devices. The connection may be established before application data is transferred, and where a stream of data is delivered in the same or different order than it was sent. The alternative to connection-oriented transmission is connectionless communication. For example, the datagram mode of communication used by the Internet Protocol (IP) and the Universal Datagram Protocol (UDP) may deliver packets out of order, since different packets may be routed independently and could be delivered over different paths. Packets associated with a TCP protocol connection may also be routed independently and could be delivered over different paths. However, for TCP connections the network communication system may provide the packets to application endpoints in the correct order.

Connection-oriented communication may be a packet-mode virtual circuit connection. For example, a transport layer virtual circuit protocol such as the TCP protocol can deliver packets of data in order although the lower layer switching is connectionless. A connection-oriented transport layer protocol such as TCP can also provide connection-oriented communications over connectionless communication. For example, if TCP is based on a connectionless network layer protocol (such as IP), this TCP/IP protocol can then achieve in-order delivery of a byte stream of data, by means of segment sequence numbering on the sender side, packet buffering and data packet reordering on the receiver side. Alternatively, the virtual circuit connection may be established in a datalink layer or network layer switching mode, where all data packets belonging to the same traffic stream are delivered over the same path, and traffic flows are identified by some connection identifier rather than by complete routing information, which enables fast hardware based switching.

As used herein, the terms "session flow" and "network flow" refer to one or more network packets or a stream of network packets that are communicated in a session that is established between at least two endpoints, such as two network devices. In at least one of the various embodiments, flows may be useful if one or more of the endpoints of a session may be behind a network traffic management device, such as a firewall, switch, router, load balancer, or the like. In at least one of the various embodiments, such flows may be used to ensure that the packets sent between the endpoints of a flow may be routed appropriately.

Typically, establishing a TCP based connection between endpoints begins with the execution of an initialization protocol and creates a single bi-directional flow between two endpoints, e.g., one direction of flow going from endpoint A to endpoint B, the other direction of the flow going from endpoint B to endpoint A, where each endpoint is at least identified by an IP address and a TCP port.

Also, some protocols or network applications may establish a separate flow for control information that enables management of at least one or more flows between two or more endpoints. Further, in some embodiments, network flows may be half-flows that may be unidirectional.

As used herein, the terms "tuple" and "tuple information" refer to a set of values that identify a source and destination of a network packet, which may, under some circumstances, be a part of a network connection. In one embodiment, a tuple may include a source Internet Protocol (IP) address, a destination IP address, a source port number, a destination port number, virtual LAN segment identifier (VLAN ID), tunnel identifier, routing interface identifier, physical interface identifier, or a protocol identifier. Tuples may be used to identify network flows.

As used herein, the terms "network monitor", "network monitoring computer", or "NMC" refer to an engine (software, hardware, or some combination) that is arranged to monitor or record flows of packets in a session that are communicated between at least two endpoints over at least one network. The NMC can provide information for assessing different aspects of these monitored flows. In at least one embodiment, the NMC may passively monitor network packet traffic without participating in the communication protocols. This monitoring may be performed for a variety of reasons, including troubleshooting and proactive remediation, end-user experience monitoring, SLA monitoring, capacity planning, application lifecycle management, infrastructure change management, infrastructure optimization, business intelligence, security, and regulatory compliance. The NMC can receive network communication for monitoring through a variety of means including network taps, wireless receivers, port mirrors or directed tunnels from network switches, clients or servers including the endpoints themselves, or other infrastructure devices. In at least some of the various embodiments, the NMC may receive a copy of each packet on a particular network segment or virtual local area network (VLAN). Also, for at least some of the various embodiments, they may receive these packet copies through a port mirror on a managed Ethernet switch, e.g., a Switched Port Analyzer (SPAN) port, a Roving Analysis Port (RAP), or the like, or combination thereof. Port mirroring enables analysis and debugging of network communications. Port mirroring can be performed for inbound or outbound traffic (or both) on single or multiple interfaces.

The NMC may track network connections from and to end points such as a client and/or a server. The NMC may also extract information from the packets including protocol information at various layers of the communication protocol stack. The NMC may reassemble or reconstruct the stream of data exchanged between the endpoints. The NMC may be arranged to perform decryption of the payload at various layers of the protocol stack. The NMC may passively monitor the network traffic or it may participate in the protocols as a proxy. The NMC may attempt to classify the network traffic according to communication protocols that are used.

The NMC may also perform one or more actions for classifying protocols that may be a necessary precondition for application classification. While some protocols run on well-known ports, others do not. Thus, even if there is traffic on a well-known port, it is not necessarily the protocol generally understood to be assigned to that port. As a result, the NMC may perform protocol classification using one or more techniques, such as, signature matching, statistical analysis, traffic analysis, and other heuristics. In some cases, the NMC may use adaptive protocol classification techniques where information used to classify the protocols may be accumulated and/or applied over time to further classify the observed protocols. In some embodiments, NMCs may be arranged to employ stateful analysis. Accordingly, for each supported protocol, an NMC may use network packet payload data to drive a state machine that mimics the protocol state changes in the client/server flows being monitored. The NMC may categorize the traffic where categories might include file transfers, streaming audio, streaming video, database access, interactive, gaming, secure sessions, and the like. The NMC may attempt to determine whether the traffic corresponds to known communications protocols, such as HTTPS, HTTP, FTP, SMTP, RTP, TDS, TCP, IP, and the like.

In at least one of the various embodiments, NMCs and/or NMC functionality may be implemented using hardware or software based proxy devices that may be arranged to intercept network traffic in the monitored networks. Accordingly, in some embodiments, the NMC may be configured to act as an endpoint within one or more networks rather than being limited to passive monitoring of network traffic.

As used herein, the terms "layer" and "model layer" refer to a layer of one or more communication protocols in a stack of communication protocol layers that are defined by a model, such as the OSI model and the TCP/IP (IP) model. The OSI model defines seven layers and the TCP/IP model defines four layers of communication protocols.

For example, at the OSI model's lowest or first layer (Physical), streams of electrical/light/radio impulses (bits) are communicated between computing devices over some type of media, such as cables, network interface cards, radio wave transmitters, and the like. At the next or second layer (Data Link), bits are encoded into packets and packets are also decoded into bits. The Data Link layer also has two sub-layers, the Media Access Control (MAC) sub-layer and the Logical Link Control (LLC) sub-layer. The MAC sub-layer controls how a computing device gains access to the data and permission to transmit it. The LLC sub-layer controls frame synchronization, flow control and error checking. At the third layer (Network), logical paths are created, known as virtual circuits, to communicated data from node to node. Routing, forwarding, addressing, internetworking, error handling, congestion control, and packet sequencing are functions of the Network layer. At the fourth layer (Transport), transparent transfer of data between end computing devices, or hosts, is provided. The Transport layer is responsible for end to end recovery and flow control to ensure complete data transfer over the network.

At the fifth layer (Session) of the OSI model, connections between applications are established, managed, and terminated. The Session layer sets up, coordinates, and terminates conversations, exchanges, and dialogues between applications at each end of a connection. At the sixth layer (Presentation), independence from differences in data representation, e.g., encryption, is provided by translating from application to network format and vice versa. Generally, the Presentation layer transforms data into the form that the protocols at the Application layer (7) can accept. For example, the Presentation layer generally handles the formatting and encrypting/decrypting of data that is communicated across a network.

At the top or seventh layer (Application) of the OSI model, application and end user processes are supported. For example, communication partners may be identified, quality of service can be identified, user authentication and privacy may be considered, and constraints on data syntax can be identified. Generally, the Application layer provides services for file transfer, messaging, and displaying data. Protocols at the Application layer include FTP, HTTP, and Telnet.

To reduce the number of layers from seven to four, the TCP/IP model collapses the OSI model's Application, Presentation, and Session layers into its Application layer. Also, the OSI's Physical layer is either assumed or may be collapsed into the TCP/IP model's Link layer. Although some communication protocols may be listed at different numbered or named layers of the TCP/IP model versus the OSI model, both of these models describe stacks that include basically the same protocols.

As used herein the term "key information" refers to cryptographic keys or other secrets that may be associated with a secure communication session. The key information may vary depending on the cipher suites or cryptographic applications that may be used for secure communication. If encrypted network packets are provided with its corresponding key information, an application may be enabled to decrypt the encrypted packets. Key information may include pre-master secrets, master secrets, session key material, or the like, or combination thereof.

As used herein the "correlation information" refers to information that may be used to correlate key information with particular flows, sessions, or connections, or the like. Correlation information may include various values that may be associated with a flow, such as, tuple information, client/server random numbers, handshake hashes, date-time information, timestamps, or the like, or combination thereof. Generally, correlation information may be information that a NMC may determine or observe without using the key information or decrypting the encrypted network traffic. Correlation information is stored in a key escrow with its corresponding key information.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to monitoring communication over a network between one or more computers using one or more network monitoring computers (NMCs). In one or more of the various embodiments, the NMCs may be arranged to monitor a plurality of network packets that may be communicated between the one or more computers.

In one or more of the various embodiments, the one or more NMCs may be employed to identify a secure communication session established between two of the one or more computers based on an exchange of handshake information that is associated with the secure communication session.

In one or more of the various embodiments, key information that corresponds to the secure communication session may be obtained from a key provider such that the key information may be encrypted by the key provider. In one or more of the various embodiments, the key provider may be a secret sharing engine executing on one or more of the one or more computers or a network hardware security module. In some embodiments, obtaining the key information, may include deriving the key information from one or more network packets that provide one or more of the handshake information or the secure communication session.

In one or more of the various embodiments, the one or more NMCs may be employed to decrypt the key information.

In one or more of the various embodiments, the one or more NMCs may be employed to derive the session key from the decrypted key information and the handshake information.

In one or more of the various embodiments, the one or more NMCs may be employed to decrypt one or more network packets that may be included in the secure communication session. In one or more of the various embodiments, decrypting the one or more network packets included in the secure communication session, may include obtaining a private signal from a server that may be arranged to handle a client request that may be part of the secure communication session such that the private signal may be based on one or more of one or more resources or one or more applications associated with the client request; and initiating one or more traffic management policies based on the private signal. For example, in some embodiments, if a client is requesting access to a particular resource or application, a secret sharing engine or other application running on a server may be arranged to provide a private signal the NMC to initiate inspection of the secure traffic. In some embodiments, the private signal may include a session key, other related keying information, policy information, or the like, that may be required to enable the NMC to perform one or more requested actions.

In one or more of the various embodiments, the one or more NMCs may be employed to inspect the one or more decrypted network packets to execute one or more rule-based policies.

In one or more of the various embodiments, correlation information associated with the secure communication session may provide such that the correlation information includes one or more of tuple information associated with the secure communication session, some or all of the handshake information, or one or more other network characteristics associated with the secure communication session. And, in some embodiments, the key information and the correlation information may be stored in a data store such that the stored key information may be indexed based on the correlation information.

In one or more of the various embodiments, the one or more NMCs may be employed to internally modify the one or more network packets by utilizing the key information to decrypt, inspect and modify the plaintext, then re-encrypt and re-authenticate the packet, and forward the modified one or more network packets to their next destination such that the NMCs change one or more portions of the modified one or more network packets In one or more of the various embodiments, the one or more NMCs may be employed to selectively decrypt one or more network flows associated with the secure communication session based on one or more characteristics of one or more other network flows.

In one or more of the various embodiments, the one or more NMCs may signal to one or both endpoints involved in a secure communication session or to a third party that the NMC is performing decryption on the secure communication session.

In one or more of the various embodiments, the one or more NMCs may be employed to selectively decrypt one or more network flows associated with a secure communication session, but may later selectively stop decrypting a flow based on policy and one or more characteristics of the flow including characteristics of the decrypted flow payload. The one or more NMCs may signal to one or both endpoints or to a third party when this occurs. Additionally, the one or more NMCs may discard the key information associated with the secure communication session and may signal to one or both endpoints or to a third party when this occurs.

In one or more of the various embodiments, the one or more NMCs may be employed to selectively decrypt the one or more network packets based on characteristics of the selected one or more network flows.

In one or more of the various embodiments, the NMC may be disposed between two or more network computers or applications that are using different secure traffic protocols or different versions of the same protocol. Accordingly, in some embodiments, the NMC may be arranged to terminate a connection (e.g., act as an endpoint) and decrypt the network traffic using one protocol and encrypted it using a different protocol before forwarding it to its next destination. For example, a client that supports or requires a more secure protocol can use continue to use its more secure protocol to exchange network traffic with the NMC. Then the NMC may decrypt the network traffic provided by the client and re-encrypt it using the less secure protocol that is supported by the server the client is trying to reach. Thus, in some embodiments, the client does not have to "step-down" to the less secure protocol to communicate with the server.

Illustrated Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)—(network) 110, wireless network 108, client computers 102-105, application server computer 116, application server computer 117, network monitoring computer 118, or the like.

At least one embodiment of client computers 102-105 is described in more detail below in conjunction with FIG. 2. In one embodiment, at least some of client computers 102-105 may operate over one or more wired and/or wireless networks, such as networks 108, and/or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), eXtensible Markup Language (XML), JavaScript Object Notation (JSON), Cascading Style Sheets (CSS), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive and/or send content between another computer. The client application may include a capability to send and/or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, application server computer 116, application server computer 117, network monitoring computer 118, or other computers.

Client computers 102-105 may further be configured to include a client application that enables an end-user to log into an end-user account that may be managed by another computer, such as application server computer 116, application server computer 117, network monitoring computer 118, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Further, client computers may be arranged to enable users to provide configuration information, or the like, to network monitoring computer 118. Also, client computers may be arranged to enable users to display reports, interactive user-interfaces, and/or results provided by network monitoring computer 118.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobile communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, application server computer 116, application server computer 117, network monitoring computer 118, client computers 102-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, and/or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

One embodiment of application server computer 116 and/or application server computer 117 is described in more detail below in conjunction with FIG. 3. Briefly, however, application server computer 116-117 includes virtually any network computer capable of hosting applications and/or providing services in network environment.

One embodiment of network monitoring computer 118 is described in more detail below in conjunction with FIG. 3. Briefly, however, network monitoring computer 118 may include include virtually any network computer that is specialized to make it capable of passively monitoring communication traffic and/or capturing network packets in a network environment.

Although FIG. 1 illustrates application server computer 116, application server computer 117, and network monitor device 118, each as a single computer, the innovations and/or embodiments are not so limited. For example, one or more functions of application server computers 116-117, and/or network monitoring computer 118, or the like, may be distributed across one or more distinct network computers. Moreover, in at least one embodiment, network monitoring computer 118 may be implemented using a plurality of network computers. Further, in at least one of the various embodiments, application server computers 116-117, and/or network monitoring computer 118 may be implemented using one or more cloud instances in one or more cloud networks. Accordingly, these innovations and embodiments are not to be construed as being limited to a single environment, and other configurations, and other architectures are also envisaged.

Illustrative Client Computer

Figure 2:
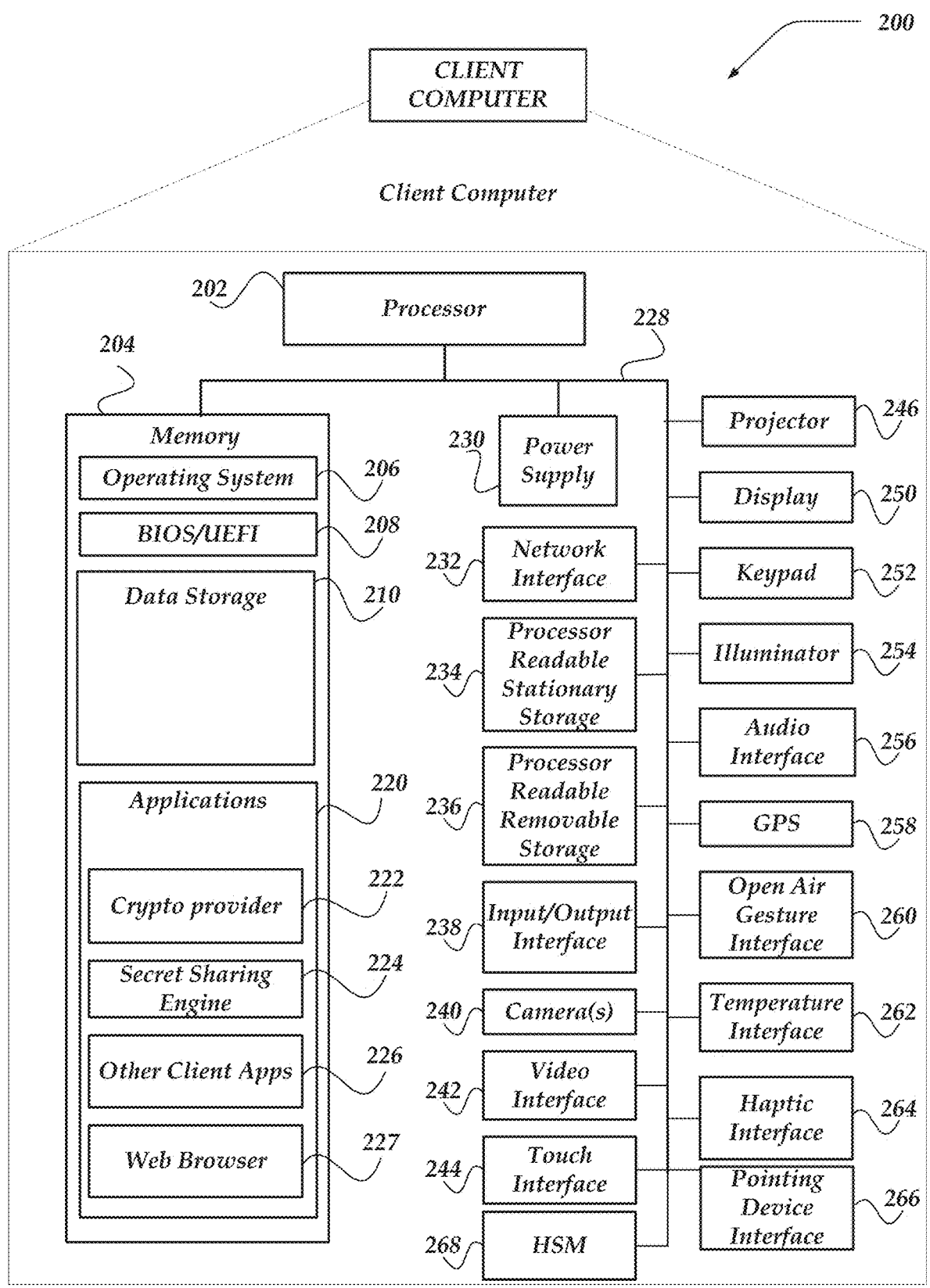
FIG. 2 illustrates a schematic embodiment of a client computer.

FIG. 2 shows one embodiment of client computer 200 that may include many more or less components than those shown. Client computer 200 may represent, for example, at least one embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 to measuring and/or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements and/or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication such as Global System for Mobile Communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (NIC).

Audio interface 256 may be arranged to produce and receive audio signals such as the sound of a human voice. For example, audio interface 256 may be coupled to a speaker and microphone (not shown) to enable telecommunication with others and/or generate an audio acknowledgement for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch and/or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication and/or provide light. Illuminator 254 may remain active for specific periods of time or in response to event messages. For example, when illuminator 254 is active, it may backlight the buttons on keypad 252 and stay on while the client computer is powered. Also, illuminator 254 may backlight these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing and/or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, and/or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect and/or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input and/or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In at least one embodiment, however, client computer 200 may, through other components, provide other information that may be employed to determine a physical location of the client computer, including for example, a Media Access Control (MAC) address, IP address, and the like.

Human interface components can be peripheral devices that are physically separate from client computer 200, allowing for remote input and/or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Piconet network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In at least one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, and/or other types of memory. Memory 204 illustrates an example of computer-readable storage media (devices) for storage of information such as computer-readable instructions, data structures, program modules or other data. Memory 204 may store BIOS/UEFI 208 (Basic Input/Output System or Unified Extensible Firmware Interface) for controlling low-level operation of client computer 200. The memory may also store operating system 206 for controlling the operation of client computer 200. It will be appreciated that this component may include a general-purpose operating system such as a version of UNIX, or Linux™, or a specialized client computer communication operating system such as Apple Inc's iOS, Windows Phone™, or the Symbian® operating system. The operating system may include, or interface with a Java virtual machine module that enables control of hardware components and/or operating system operations via Java application programs.

Memory 204 may further include one or more data storage 210, which can be utilized by client computer 200 to store, among other things, applications 220 and/or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, and/or otherwise process instructions and data. Applications 220 may include, for example, crypto provider 222, secret sharing engine 224, other client applications 226, web browser 227, or the like. Client computers may be arranged to exchange communications, such as, queries, searches, messages, notification messages, event messages, alerts, performance metrics, log data, API calls, or the like, combination thereof, with application servers and/or network monitoring computers.

Secret sharing engine 224 may be a process or service that is arranged to communicate one or more cryptographic secrets, key information, or the like, to one or more NMCs, such as, NMC 116. Further, in at least one of the various embodiments, secret sharing engine 224 may be arranged to be a plug-in of browser 227. Also, in at least one of the various embodiments, secret sharing engine 224 may be embedded into cryptographic provider and/or a plug-in associated with cryptographic provider 222.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include one or more embedded logic hardware devices in addition to or instead of one or more CPUs, such as, an Application Specific Integrated Circuits (ASICs), Field Programmable Gate Arrays (FPGAs), Programmable Array Logics (PALs), or the like, or combination thereof. The one or more embedded logic hardware devices may directly execute embedded logic to perform actions. Also, in one or more embodiments (not shown in the figures), client computer 200 may include one or more hardware microcontrollers in addition to or instead of one or more CPUs. In at least one embodiment, the one or more microcontrollers may directly execute their own embedded logic to perform actions and access its own internal memory and its own external Input and Output Interfaces (e.g., hardware pins and/or wireless transceivers) to perform actions as a System On a Chip (SOC), or the like.

Illustrative Network Computer

Figure 3:
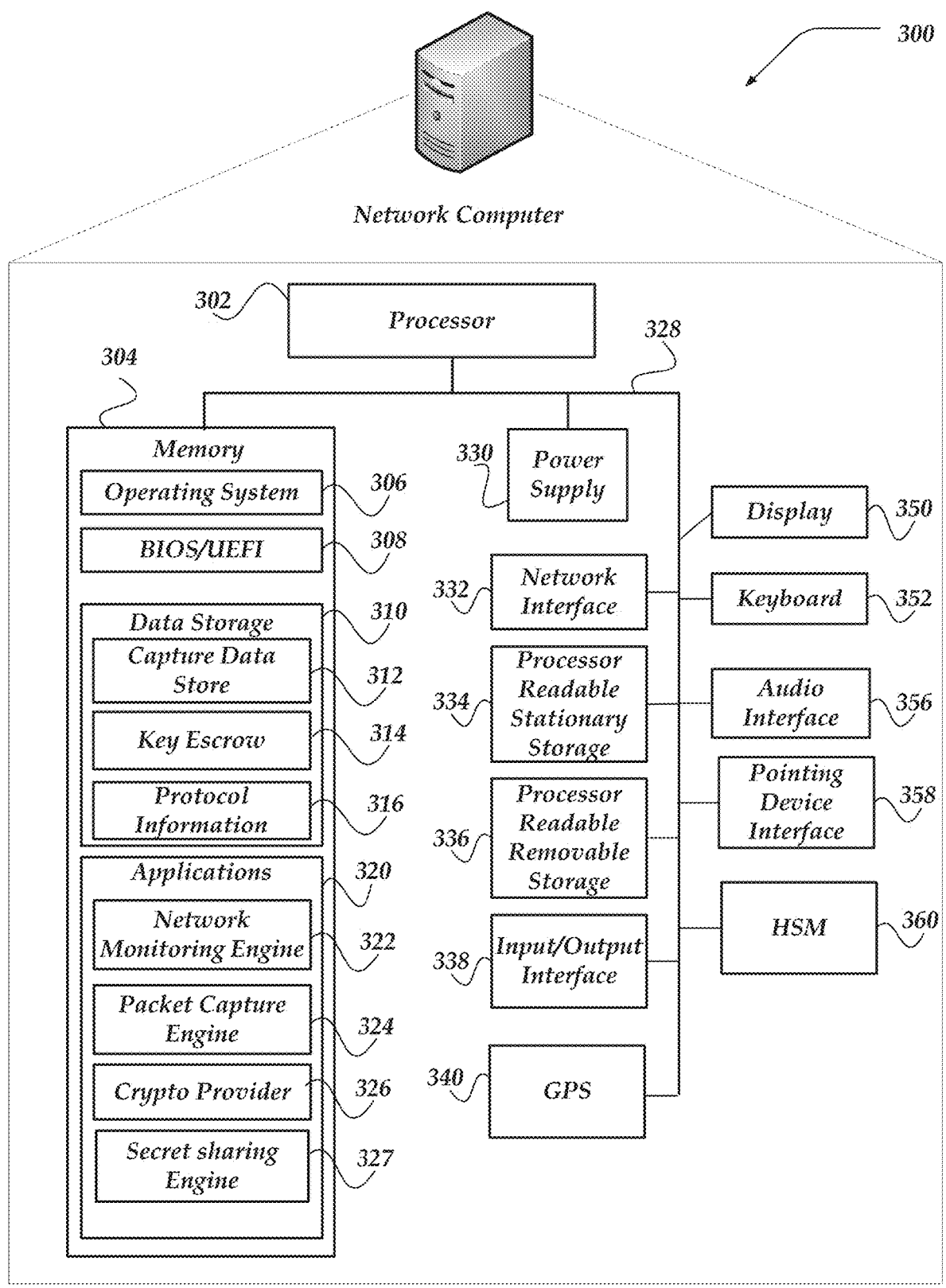
FIG. 3 illustrates a schematic embodiment of a network computer.

FIG. 3 shows one embodiment of network computer 300 that may be included in a system implementing at least one of the various embodiments. Network computer 300 may include many more or less components than those shown in FIG. 3. However, the components shown are sufficient to disclose an illustrative embodiment for practicing these innovations. Network computer 300 may represent, for example, one embodiment of at least one of application server computers 116-117 and/or network monitoring computer 118 of FIG. 1.

As shown in the figure, network computer 300 includes a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others and/or generate an audio acknowledgement for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. Display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect and/or measure data that is external to network computer 300. Human interface components can be physically separate from network computer 300, allowing for remote input and/or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In at least one embodiment, however, network computer 300 may, through other components, provide other information that may be employed to determine a physical location of the client computer, including for example, a Media Access Control (MAC) address, IP address, and the like.

Memory 304 may include Random Access Memory (RAM), Read-Only Memory (ROM), and/or other types of memory. Memory 304 illustrates an example of computer-readable storage media (devices) for storage of information such as computer-readable instructions, data structures, program modules or other data. Memory 304 stores BIOS/UEFI 308 (Basic Input/Output System or Unified Extensible Firmware Interface) for controlling low-level operation of network computer 300. The memory also stores an operating system 306 for controlling the operation of network computer 300. It will be appreciated that this component may include a general-purpose operating system such as a version of UNIX, or Linux™, or a specialized operating system such as Microsoft Corporation's Windows® operating system, or the Apple Inc.'s, macOS® operating system. The operating system may include, or interface with a Java virtual machine module that enables control of hardware components and/or operating system operations via Java application programs. Likewise, other runtime environments may be included.

Memory 304 may further include one or more data storage 310, which can be utilized by network computer 300 to store, among other things, applications 320 and/or other data. For example, data storage 310 may also be employed to store information that describes various capabilities of network computer 300. The information may then be provided to another device or computer based on any of a variety of methods, including being sent as part of a header during a communication, sent upon request, or the like. Data storage 410 may also be employed to store social networking information including address books, buddy lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, capture database 312, key escrow 314, protocol information 316, or the like. Capture database 312 may be a data store that contains one or more records, logs, events, network packets, network packet portions, or the like, produced during monitoring of the networks. And, protocol information 316 may store various rules and/or configuration information related to one or more network communication protocols that may be employed, or the like.

Applications 320 may include computer executable instructions which, when executed by network computer 300, transmit, receive, and/or otherwise process messages (e.g., SMS, Multimedia Messaging Service (MMS), Instant Message (IM), email, and/or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, databases, web services, and so forth. Applications 320 may include network monitoring engine 322 packet capture engine 324, crypto provider 326, or secret sharing engine 327 that perform actions further described below. In at least one of the various embodiments, one or more of the engines may be implemented as modules and/or components of another engine. Further, in at least one of the various embodiments, engines or applications may be implemented as operating system extensions, modules, plugins, or the like.

Secret sharing engine 327 may be a process or service that is arranged to communicate one or more cryptographic secrets, key information, or the like, to one or more NMCs, such as, NMC 116. Further, in at least one of the various embodiments, secret sharing engine 327 may be arranged to be a plug-in of a web browser or other engine or application. Also, in at least one of the various embodiments, secret sharing engine 327 may be embedded into cryptographic provider and/or a plug-in associated with cryptographic provider 326. Also, in some embodiments, secret sharing engine 327 may be arranged to communicate one or more cryptographic secrets, key information, or the like, to a key escrow or other computer.

Furthermore, in at least one of the various embodiments, network monitoring engine 322, packet capture engine 324, crypto provider 326, or secret sharing engine 327 may be operative in a cloud-based computing environment. In at least one of the various embodiments, these engines, and others, that comprise the management platform may be executing within virtual machines and/or virtual servers that may be managed in a cloud-based based computing environment. In at least one of the various embodiments, in this context the engines may flow from one physical network computer within the cloud-based environment to another depending on performance and scaling considerations automatically managed by the cloud computing environment. Likewise, in at least one of the various embodiments, virtual machines and/or virtual servers dedicated to network monitoring engine 322, packet capture engine 324, crypto provider 326, or secret sharing engine 327 may be provisioned and de-commissioned automatically.

Also, in at least one of the various embodiments, network monitoring engine 322, packet capture engine 324, crypto provider 326, or secret sharing engine 327, or the like, may be located in virtual servers running in a cloud-based computing environment rather than being tied to one or more specific physical network computers.

Further, network computer 300 may also comprise hardware security module (HSM) 360 for providing additional tamper resistant safeguards for generating, storing and/or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, and/or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include one or more embedded logic hardware devices in addition to or instead of one or more CPUs, such as, an Application Specific Integrated Circuits (ASICs), Field Programmable Gate Arrays (FPGAs), Programmable Array Logics (PALs), or the like, or combination thereof. The one or more embedded logic hardware devices may directly execute embedded logic to perform actions. Also, in one or more embodiments (not shown in the figures), network computer 300 may include one or more hardware microcontrollers in addition to or instead of one or more CPUs. In at least one embodiment, the one or more microcontrollers may directly execute their own embedded logic to perform actions and access its own internal memory and its own external Input and Output Interfaces (e.g., hardware pins and/or wireless transceivers) to perform actions as a System On a Chip (SOC), or the like.

Illustrative Logical System Architecture

Figure 4:
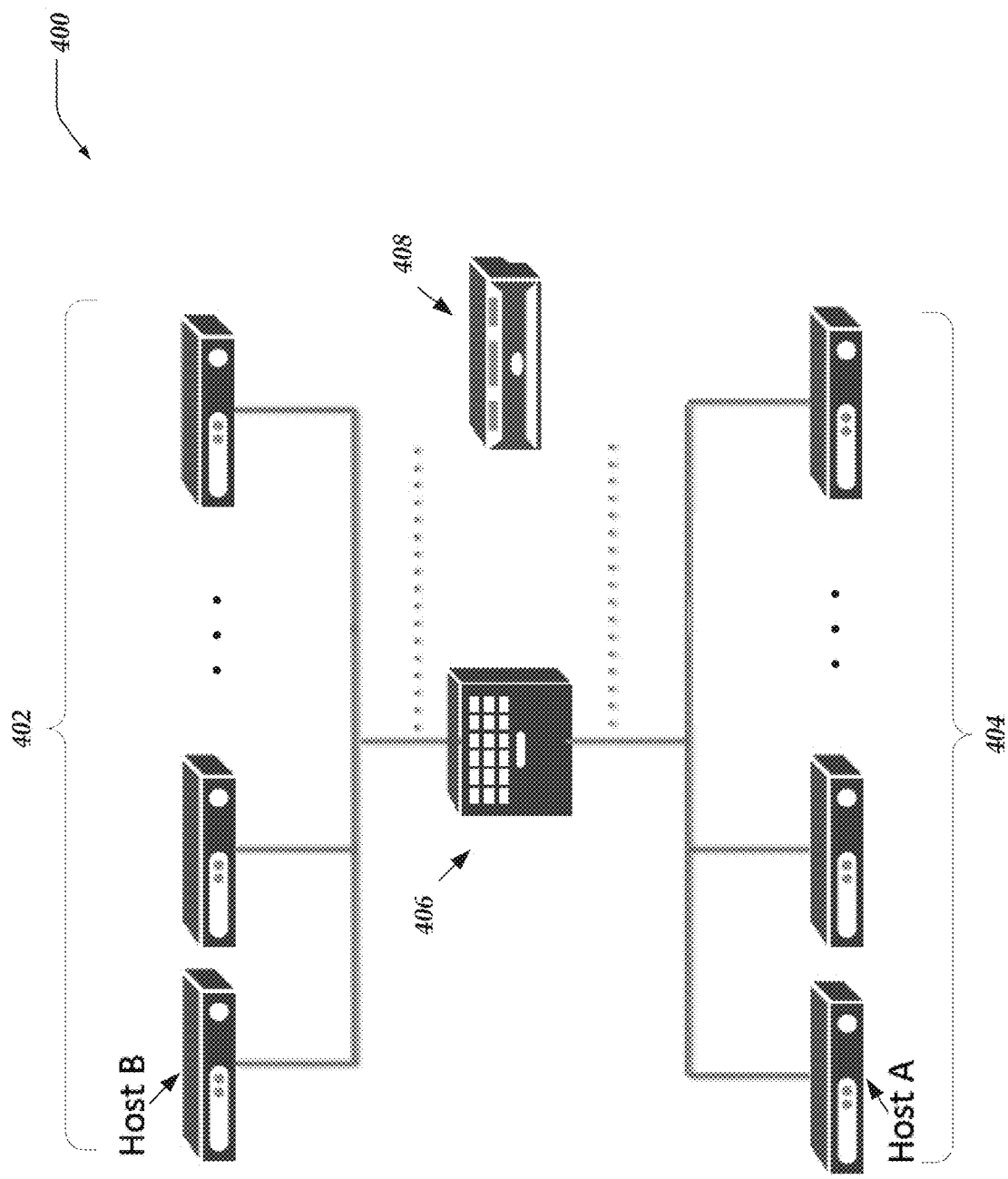
FIG. 4 illustrates a logical architecture of a system for inline secret sharing in accordance with at least one of the various embodiments.

FIG. 4 illustrates a logical architecture of system 400 for inline secret sharing in accordance with at least one of the various embodiments. System 400 may be arranged to include a plurality of network devices and/or network computers 402 on first network and a plurality of network devices and/or network computers 404 on second network. In this example, communication between the first network and the second network may be managed by switch 406. Also, network monitoring computer (NMC) 408 may be arranged to passively monitor or capture packets (network packets) communicated in network connection flows between network devices or network computers 402 on first network and network devices or network computer 404 on second network. For example, the communication of flows of packets between the Host B network computer and the Host A network computer may be flowing through switch 406. And, in some embodiments, NMC 408 may be arranged to passively monitor capture some or all of the network traffic comprising one or more of these flows. Also, NMC 408 or other NMCs may be arranged to passively monitor network communication between and among hosts that are on the same network, such as, network computers 402.

NMC 408 may be arranged to receive network traffic for monitoring through a variety of means including network taps, wireless receivers, port mirrors or directed tunnels from network switches, clients or servers including the endpoints themselves, or other infrastructure devices. In at least some of the various embodiments, the NMC may receive a copy of each packet on a particular network segment or virtual local area network (VLAN). Also, for at least some of the various embodiments, NMCs may receive these packet copies through a port mirror on a managed Ethernet switch, e.g., a Switched Port Analyzer (SPAN) port, or a Roving Analysis Port (RAP). Port mirroring enables analysis and debugging of network communications. Port mirroring can be performed for inbound or outbound traffic (or both) on single or multiple interfaces.

In at least one of the various embodiments, NMCs, such as, NMC 408 may be arranged to capture data from some or all observed network flows. In modern network environments some or more all of the network traffic may be encrypted. Accordingly, NMC 408 may be arranged to capture encrypted packets and endpoint keying information such that they may be decrypted in real-time for real-time monitoring.

In at least one of the various embodiments, an NMC, such as, NMC 408 may be arranged to passively observe both directions of network flows. Accordingly, an NMC may be arranged to observe the network conversation between different endpoints in the monitored network. In some embodiments, NMCs may be arranged to monitor both directions of a transaction based traffic between endpoints. Accordingly, in at least one of the various embodiments, NMCs may be arranged to identify network flows that may be using request/response protocols.

In one or more of the various embodiments, an NMC, such as, NMC 408 may be arranged to detect handshaking traffic between two or more endpoints that may be establishing a secure connection. In some embodiments, NMCs may be arranged to include configuration information, rules, or the like, that may be used to identify one or more well-known cryptographically secure communication protocols, such as, Secure Sockets Layer (SSL), Transport Layer Security (TLS), Secure Shell (SSH), Internet Protocol Security (IPsec), or the like. Likewise, in some embodiments, the NMCs may be arranged to include configuration, rules, or the like, that may be used to identify one or more custom or modified cryptographically secure communication protocols.

As described above, in at least one of the various embodiments, NMCs may be arranged to monitor network flows to observe or record various metrics associated with the flow traffic. In some embodiments, metrics, such as, traffic rate, changes in traffic rate, latency, traffic volume, or the like, or combination thereof, may be employed to identify turns. Further, since the NMC has access to the wire traffic, it has access to the entire OSI layer stack. Accordingly, metrics collected at lower layers may be correlated with information from higher layers to characterize network traffic and identify turns.

Further, in some embodiments, NMCs may be arranged to recognize and understand various well-known application level protocols, such as, HTTP, SMTP, FTP, DNS, POP3, IMAP, or the like. Accordingly, in at least one of the various embodiments, NMCs may observe communication between clients and servers and use configuration information, including rules to identify if interesting or actionable traffic may be occurring.

Further, in at least one of the various embodiments, NMCs may be arranged to discover network applications, such as, databases, media servers (e.g., video streaming, music streaming, or the like), video conferencing/chatting, VOIP applications, web servers, or the like. Thus, in some embodiments, NMCs may be arranged to monitor the traffic of network flows in the context of the particular applications.

In at least one of the various embodiments, NMCs may be arranged to employ various conditions, rules, pattern matching, heuristics, or the like, or combination thereof, implemented using scripts, compiled computer languages, ASICs, FPGAs, PALs, or the like, or combination thereof. In some embodiments, NMCs may be arranged include one or more conditions, rules, pattern matching, heuristics, or the like, that may be arranged to identify protocols, applications, turns, or the like, for various known network protocols, application protocols, network applications, or the like. Also, in at least one of the various embodiments, NMCs may be arranged to enable users to install additional custom/specialized conditions, rules, pattern matching, heuristics, or the like, to identify other protocols, applications, network applications, or the like.

Figure 5:
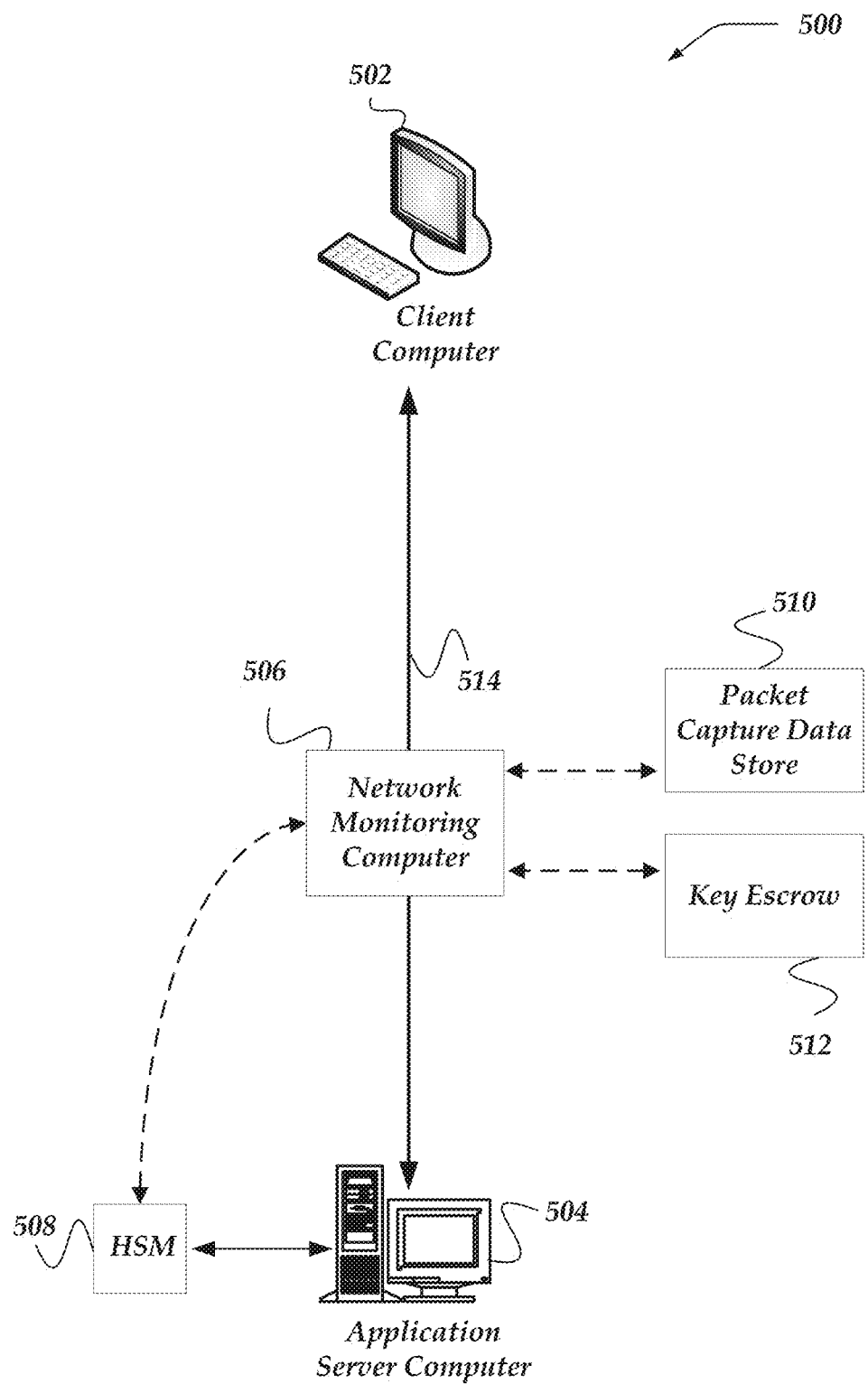
FIG. 5 illustrates a logical architecture of a system for inline secret sharing in accordance with at least one of the various embodiments.

FIG. 5 illustrates a logical architecture of system 500 for inline secret sharing in accordance with at least one of the various embodiments. In at least one of the various embodiments, system 500 comprises client computer 502, application server computer 504, network monitoring device 506, optionally, hardware security module 508, packet capture data store 510, key information escrow 512, or the like.

In at least one of the various embodiments, client computer 502 may be a computer that has one or more applications that may be arranged to securely communicate with application server computer 504 over network path 514. Secure communication may be comprised of one or more cryptographically secure network communication protocols, including, SSL, TLS, SSH, IPsec, or the like, or combination thereof. For example, in some embodiments, client computer 502 may be hosting a web browser that is securely accessing a website that is served by a web server running on application server computer 504. Another non-limiting example, may include client computer 502 accessing an application running on application server computer 504 over a virtual private network. As described above, NMC 506 may be arranged to passively monitor the network packets passing through network path 514. Accordingly, NMC 506 may be arranged to monitor the network traffic comprising communication between client computer 502 and application server computer 504.

In at least one of the various embodiments, application server computer 504 may employ a network hardware security module, such as, HSM 508 to provide one or more cryptographic services that may be employed to perform secure communication with client computer 502. For example, HSM 508 may be used to generate or store cryptographic keys (including session keys) for establishing secure communication with clients, such as, client computer 502.

In at least one of the various embodiments, client applications and server applications running on client computers, such as, client computer 502 and/or server computers, such as, server computer 504 may be arranged to employ one or more cryptographic protocols to provide secure communication between them over networks, including network path 514. Various secure communication protocols may define handshake protocols, authentication protocols, key exchange protocols, or the like, or combination thereof, that implement the secure communication between the clients and servers. Accordingly, in at least one of the various embodiments, the cryptographic protocols may include using one or more session keys to encrypt or decrypt the communication traffic. Thus, in at least one of the various embodiments, if a secure communication session is established between a server and a client, an NMC, such as, NMC 506 may require a session key to decrypt the encrypted network packets that may be communicated over the secure communication channel. For example, if a client application running on client computer 502 establishes a secure communication session with a server application running on server computer 504, NMC 506 may require key information, such as, a session key to decrypt the secure network traffic to perform monitoring and analysis of the contents of the packets in comprising the secure network traffic.

In some cases, NMC 506 may be able to derive and/or generate a session key by passively monitoring the handshake information that may be exchanged between the client and server computer. However, for other cases, the client and server may employ a handshake protocol that cryptographically prevents NMC 506 from being able to obtain or generate a session key using information gathered by passive monitoring. For example, if the client and server employ an ephemeral Diffie-Hellman key exchange, it may be impossible for NMC 506 to observe and/or capture the information that may be required to generate the session key using just passive monitoring where the NMC is not acting as an endpoint of the secure connection. Also, in at least one of the various embodiments, other well-known and/or custom perfect forward secrecy (PFS) variants for key exchange may also prevent NMC 506 from obtaining or deriving a session key just by using passive monitoring.

In some embodiments, where NMC 506 is unable to obtain or derive a session key using passive monitoring, one or more of client computer 502, server computer 504, or hardware security module 508, may be arranged to provide and/or communicate session key information for a given secure communication session to NMC 506. In such cases, if a secure communication session may be established, a key provider may provide the appropriate session key information to an NMC, such as NMC 506.

In at least one of the various embodiments, NMC 506 may be arranged to request the session key once it has observed and determined that the cryptographic handshake between the client and server has finished. In at least one of the various embodiments, key providers may be arranged to communicate (e.g., push) session key information to an NMC after the secure communication session has been established.

In at least one of the various embodiments, there may be a time gap between when a client and server established as secure communication session and when the NMC is provided a session key. Accordingly, in at least one of the various embodiments, NMCs may be arranged to buffer the secure communication traffic until a session key for the secure communication channel is provided. If a session key is provided to the NMC, the NMC may first decrypt the buffered encrypted data and then decrypt the secure communication on the fly as it is received by the NMC.

In at least one of the various embodiments, if the secure communication traffic may be decrypted by a NMC, such as, NMC 506, it may perform one or more monitoring or analysis actions based on the decrypted contents of the secure communication. For example, in some embodiments, such actions may include modifying the content, tagging the traffic, applying a QoS policy, content switching, load-balancing, or the like, depending one or more rule-based policies.

In one or more of the various embodiments, a NMC, such as NMC 506 may be arranged to capture packets for storing in a packet capture data store, such as packet capture data store 510. In some embodiments encrypted packets may be captured and stored. Likewise, in some embodiments, unencrypted packets may be captured by NMC 506 and stored in packet capture data store 510.

In one or more of the various embodiments, key escrow 516 may be a data store arranged to store cryptographic key, cryptographic key information, or the like. In one or more of the various embodiments, secret sharing engines, such as secret sharing engine 222 or secret sharing engine 327 may be arranged to intercept and share the cryptographic key, the cryptographic key information, or the like. The secret sharing engines may be arranged to store the cryptographic information in key escrow 512. In one or more of the various embodiments, the cryptographic information stored in key escrow may be used to decrypt captured encrypted packets at a later time.

In one or more of the various embodiments, the secret sharing engines may be arranged to communicate with an NMC to enable correlation information to be associated with the cryptographic key information. For example, NMC 508 may be arranged to obtain key information from the secret sharing engine. Accordingly, NMC 508 may determine the correlation information that correlates the communication session with the key information. Thus, in this example, NMC 506 may store the key information with the relevant correlation information in the key escrow 512.

In one or more of the various embodiments, a secret sharing engine may be arranged to determine the correlation information on its own. Accordingly, in some embodiments, the secret sharing engine may store the correlation information and the key information in a key escrow such as key escrow 512.

In one or more of the various embodiments, NMCs, such as NMC 506 may be arranged to decrypt monitored packets before they are stored in packet capture data store 510. In other embodiments, the NMC may be arranged to store or escrow the session key or other keying information to enable later decryption of captured packets rather than storing decrypted packets in packet capture data store 510. Also, in other embodiments, NMCs, such as NMC 506 may be arranged to decrypt some or all of the packets in real-time to enable network management policies to be applied based on the content of the packets. Accordingly, in some embodiments, after monitoring tasks are completed, the decrypted version of the packets may be discarded and the encrypted versions may be stored in the packet capture data store.

In one or more of the various embodiments, some or all of the key information may be provided to NMC 506 inline or otherwise included in network traffic communicated over network path 514. In some embodiments, the secret sharing engines residing on the computers participating in the secure communication session (e.g., client computer 502, application server computer 504, or the like) may be arranged to share secrets inline by including key information that includes some or all of the key information in one or more fields or one or more packets of the secure communication session established between client computer 502 or server computer 504. In some embodiments, the key information shared inline may be included in the network flow(s) (e.g., network path 514) comprising the secure communication session that is monitored by NMC 506. Accordingly, in some embodiments, the key information may be provided to NMC 506 during the secure handshake or other phases of the secure communication session.

In one or more of the various embodiments, NMC 506 may be arranged to detect and identify key information and extract the actual key information included in the network packets exchanged between clients and servers. In some embodiments, key information not normally exchanged between clients and servers may be included in the network packets by a secret sharing engine running on the clients or servers. In one or more of the various embodiments, the key information may be encrypted using a cryptographic key that is known to the secret sharing engines and NMC 506 and unknown to other applications involved in the secure communication session. In some embodiment, secret sharing engines and NMCs may be arranged to employ public key encryption to encrypt the key information.

For example, in some embodiments, a secret sharing engine on client computer 502 may encrypt and add the key information to the secure session traffic. Thus, in some embodiments, if NMC 506 receives the key information it may decrypt it for use as described herein. Also, in some embodiments, NMC 506 may be arranged to modify the network traffic to strip the key information from the secure session traffic rather than forwarding it to application server computer 504 or client computer 502 depending on the direction of the communication flow.

Accordingly, in one or more of the various embodiments, one or more NMCs may be arranged to internally modify the one or more network packets by removing the key information from the one or more network packets that are associated with the secure communication session. Then the one or more NMCs may be arranged to forward the modified one or more network packets to their next destination, such that modified network packets to appear as if they were are non-modified.

For example, in one or more of the various embodiments, secret sharing engine may be arranged to compute one or more CRCs, hash values, sequence numbers, packet/message sizes, or the like, for the handshake traffic or other secure traffic before the encrypted key information is added to the secure session traffic or handshake traffic. Accordingly, one or more of the precomputed CRCs, hash values, sequence numbers, packet/message sizes, or the like, may be provided to the NMC along with the key information. Then, in one or more of the various embodiments, one or more of the precomputed CRCs, hash values, sequence numbers, packet/message sizes, or the like, may be used to restore the network traffic after the key information is removed from the network traffic.

For example, in one or more of the various embodiments, the secrets sharing engine on client computer 502 may be arranged to provide one or more special purpose TLS record packets that may include the encrypted key information over network path 514. Then, for this example, if NMC 506 detects the special purpose TLS record packet, the key information may be obtained and the special purpose TLS record packet may be removed from the secure session traffic and discarded rather than being forwarded to server computer 504.

As used herein the terms client, or client computer, refer to applications, programs or computers that may initiate a request for services from a server computer. Likewise, the terms server, or server computer, refer to applications, programs, or computers that may be arranged to respond to a request for services from a client computer. For clarity, clients and servers are described separately, but one of ordinary skill in the art will appreciate that a given computer, application, or program may sometimes operate as a server and other times operate as a client depending on whether it is requesting services or responding to requests for services.

Figure 6:
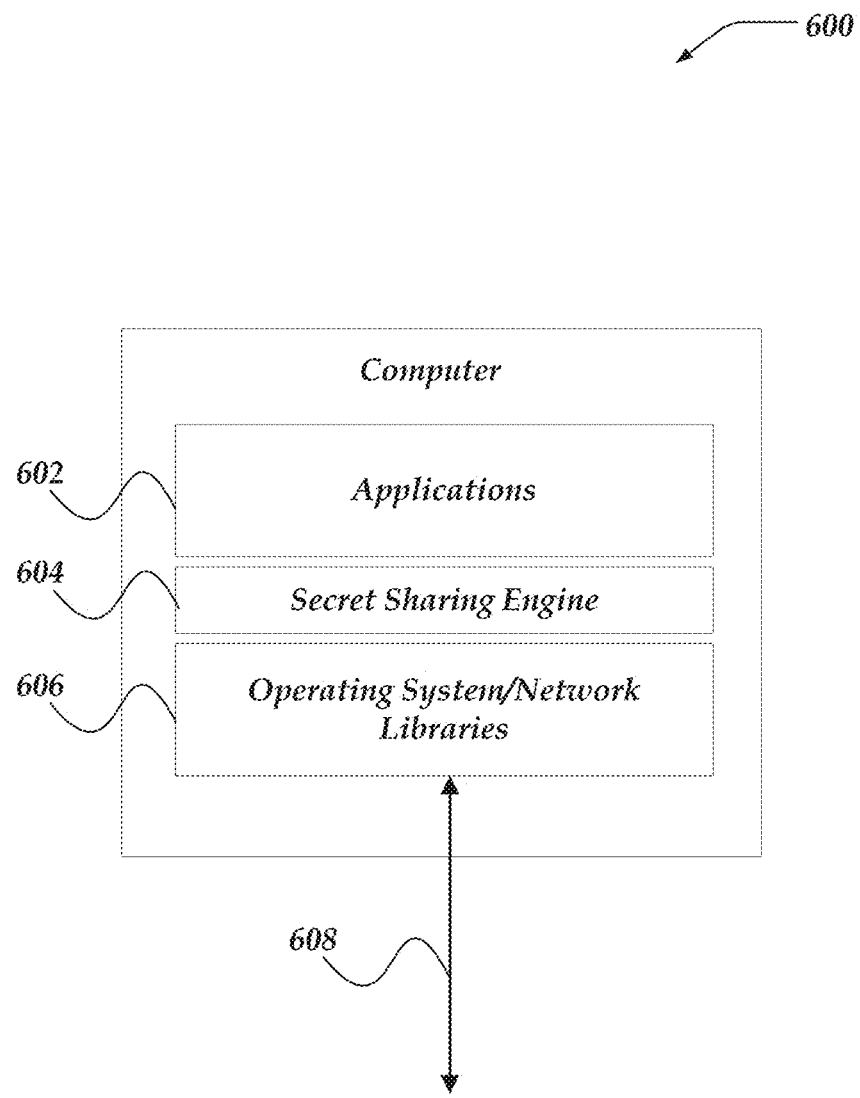
FIG. 6 illustrates a logical architecture of a computer for integrating a secret sharing engine in accordance with at least one of the various embodiments.

FIG. 6 illustrates a logical architecture of computer 600 for integrating a secret sharing engine in accordance with at least one of the various embodiments. In one or more of the various embodiments, as described above, a secret sharing engine may be installed on computers to enable cryptographic key information to be shared in line with an NMC. In one or more of the various embodiments, computers, such as computer 600 may be arranged include applications 602, secret sharing engine 604, operation system 606, or the like. In one or more of the various embodiments, operating system 606 may include one or more system libraries that enable communication over network path 608 to other computers or networks.

In one or more of the various embodiments, secret sharing engine 604 may be disposed logically between applications 602 and operating system 606. Accordingly, secret sharing engine 604 may be arranged to passively intercept API calls to discover cryptographic secrets, including session keys that may be employed by computer 600 to communicate with other computers.

Secret sharing engine 604 may be a process or service that is arranged to communicate one or more cryptographic secrets, key information, or the like, to one or more NMCs, such as, NMC 116 over network path 608. In some embodiments, the key information may be shared inline during or as part of a secure connection established between a client and a server. Further, in at least one of the various embodiments, secret sharing engine 604 may be arranged to be a plug-in of a web browser or other application. Also, in at least one of the various embodiments, secret sharing engine 604 may be embedded into cryptographic provider and/or a plug-in associated with a cryptographic provider, such as cryptographic provider 326.

In one or more of the various embodiments, secret sharing engines, such as secret sharing engine 604, secret sharing engine 224, secret sharing engine 327, or the like, may be arranged to provide system library interfaces that mimic standard interfaces to enable client applications that expect a standard or common interfaces to operate without modifications.

In one or more of the various embodiments, a secret sharing engine may be arranged to integrate with network service pipelines that may be supported by the operating system or system libraries. For example, some operating systems may be arranged to enable authorized programs, drivers, or modules (e.g., kernel level services, Windows WDM drivers, or the like) to be inserted into a network service pipeline.

In one or more of the various embodiments, a secret sharing engine may be arranged to enable client applications to explicitly make calls to the secret sharing engine. Accordingly, in one or more of the various embodiments, the client application may expressly control or direct the sharing of cryptographic secrets.

Figure 7:
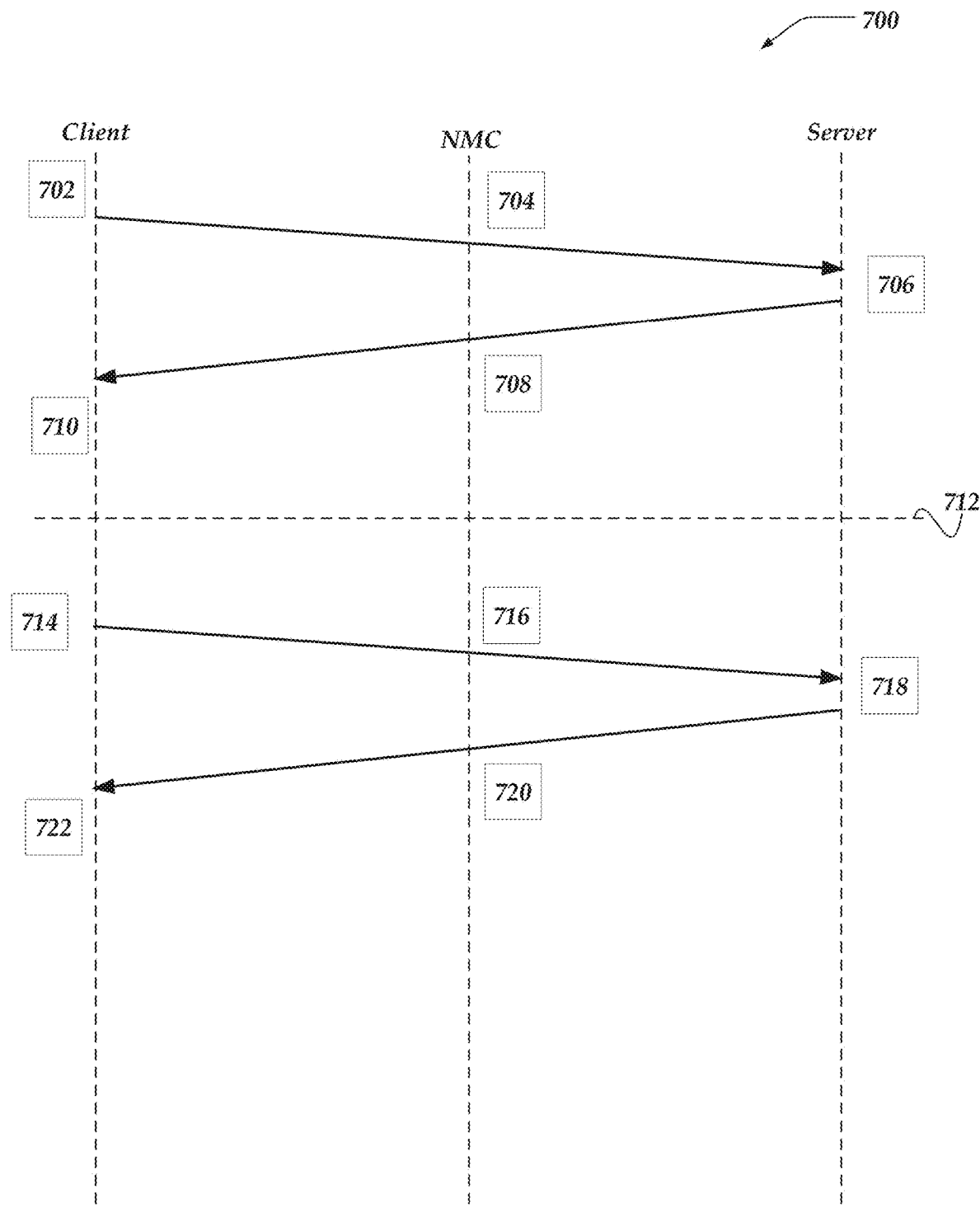
FIG. 7 illustrates a logical sequence diagram representation of a sequence for inline secret sharing that may be in accordance with one or more of the various embodiments.

FIG. 7 illustrates a logical sequence diagram representation of sequence 700 for inline secret sharing that may be in accordance with one or more of the various embodiments. In one or more of the various embodiments, sequence 700 illustrates network traffic exchanged by a client and a server with an NMC (e.g., NMC 408 or NMC 506) arranged to monitor both directions of the network traffic.

At step 702, in one or more of the various embodiments, a client may be communicating over a network with a server to establish a secure connection with the server. In one or more of the various embodiments, the particular network traffic comprising the communication may vary depending on the communication protocols or cryptographic protocol being used. For example, if the client and server are using TLS, after a TCP connection is established, the client may send a ClientHello message. The ClientHello message may include various specifications in clear-text such as, protocol version, list of supported cipher suites, or other TLS options.

In one or more of the various embodiments, a secret sharing agent running on the client may be arranged to encrypt and include secrets or other information in the network traffic used by the client to establish the secure connection.

At step 704, in some of the various embodiments, the NMC may be arranged to monitor the network traffic from the client to the server. In one or more of the various embodiments, since in this example, the client may be starting a handshake for a secure connection, the NMC may be arranged to activate a process or ruleset arranged to monitor or detect the establishment of a secure connection.

At step 706, in some embodiments, the server may respond based on the client communications. Accordingly, the server may provide a response based on the handshake information provided by the client. For example, if the client and server are using TLS, the server may be arranged to respond with selected a protocol version, cipher suite, its verifiable certificate, or the like, depending on the values included in the client's handshake information.

At step 708, the NMC may be arranged to monitor the network traffic from the server to the client. At this step the NMC may observe that the secure handshake is in process.

At step 710, in one or more of the various embodiments, the client may receive the server responses and continue to send one or more network packets to complete the establishment of the secure connection. The number of handshake messages exchanged between the client and server to establish a secure connection will depend on the particular communication protocol (e.g., TCP) or the cryptographic protocol (e.g. TLS) being used. Accordingly, in the interest of clarity and brevity additional steps are not illustrated by sequence 700.

For example, in some embodiments, if TLS is being used, the client and server may begin a key exchange process to establish a secure key for performing the secure communication. Also, in some embodiments, the handshake may continue while the client and server negotiate an acceptable cipher suite, or the like. Accordingly, in some embodiments, a secret sharing agent running on the client or server (or both) may inject information into the network traffic that enables the NMC to generate or recreate the keys or keying information that may be necessary to selectively decrypt the secure traffic exchanged between the client and server.

At phase line 712, the client and server may be considered to have completed the secure handshake and established a secure connection or secure communication session. Subsequent, communication between the client and server may be considered to cryptographically secured.

At step 714, in one or more of the various embodiments, the client may provide application data over the secure connection.

At step 716, in one or more of the various embodiments, the NMC may be arranged to monitor some or all of the network traffic exchanged between the client and server. In one or more of the various embodiments, the NMC may employ the key information it obtained while monitoring the secure handshake to decrypt encrypted traffic to enable payload inspection based on monitoring rules to be applied.

In one or more of the various embodiments, if the secret sharing engine of the client has include additional information for the NMC in the network traffic, the NMC may be arranged to remove the additional information before the network traffic is allowed to continue to the server. In one or more of the various embodiments, the NMC may be arranged to locally store some or all the removed information and associate it with one or more of the network flows comprising the secure connection.

In one or more of the various embodiments, the secret sharing engine of the client or server (or both) may establish or use a previously established communication channel directly to the NMC to provide key information to the NMC.

In one or more of the various embodiments, the NMC may be arranged to locally store some or all the key information and associate it with one or more of the network flows comprising the secure connection.

At step 718, in one or more of the various embodiments, the server may receive application data from the client over the secure connection. The server may be arranged to provide an appropriate response depending the contents of the message and its associated application.

At step 720, in one or more of the various embodiments, the NMC may monitor application data sent by the server. In one or more of the various embodiments, the NMC may employ the key information it obtained while monitoring the secure handshake to decrypt encrypted traffic to enable monitoring of the application payload data based on the applications of one or more monitoring rules.

In one or more of the various embodiments, the NMC may be arranged to lookup additional information that may be have been provided by the client secret sharing engine and add it back into the network traffic. In some embodiments, the additional information may be retrieved from a local data store. In some embodiments, the additional information may be indexed or keyed to information, such as tuple information, or the like, that may be associated with the network flows comprising the secure connection.

At step 722, in one or more of the various embodiments, the client may receive application data from the server over the secure connection. The client may be arranged to provide an appropriate response depending the contents of the message and its associated application.

Note, steps 714-722 may be assumed to repeat in accordance with the application(s) using the secure session. Various, events such as connection termination, communication protocol resets, cipher state resets, or the like, may trigger supplemental handshaking, or the like, that the NMC may be arranged to monitor as well.

FIG. 8 illustrates a logical representation of table 800 that a NMC may employ to associate session keys or other key information with particular secure communication sessions, secure connections, or network flows in accordance with one or more of various embodiments. In at least one of the various embodiments, table 800 may be implemented using one or more data structures, such as, lists, arrays, associative arrays, or the like, or combination thereof. Furthermore, one of ordinary skill in the art will appreciate that other data structures or table arrangements are within the scope of the innovation described herein. However, the description of table 800 is at least sufficient to enable one or ordinary skill in the art to practice the innovations described herein.

In at least one of the various embodiments, some or all of the information represented by table 800 may be stored in capture data store 312, key escrow 314, or the like, on a network computer, such as network computer 300. In some embodiments, table 800 may be stored in the working memory of a NMC and used during real-time decryption of network packets as they are monitored.

In at least one of the various embodiments, column 802 of table 800 may contain a value that corresponds to a particular network connection, network flow, communication channel, or the like. The NMC may be arranged to index, key, or otherwise identify each network flow that it is monitoring. In at least one of the various embodiments, column 804 may include a cryptographic session key or other key information that is associated with a secure network flow. The session key may correspond to a secure communication session that is occurring over a secure network flow. In at least one of the various embodiments, column 806 may include one or more types of correlation information that may be associated with a network flow. The correlation information value may be used in part to determine which network flow a provided session key corresponds to. In some embodiments, correlation information may include one or more of tuple information associated with a secure communication session, some or all of the handshake information, one or more other network characteristics associated with the secure communication session, or the like. In some embodiments, column 808 may contain one or more fields of additional data that may be associated with a network flow. Column 808 represents additional information or metrics that may be collected or associated with a given network flow.

In one or more of the various embodiments, a flow identifier (e.g., values in column 802) may be based on the flow tuple information associated with a secure network flow or secure network connection. In some embodiments, a flow identifier may be generated by using a hash of some or all of the tuple information for a flow. For example, Flow ID=HashFunction(Source IP, Destination IP, Source Port, Destination Port).

Generalized Operations

Figure 9:
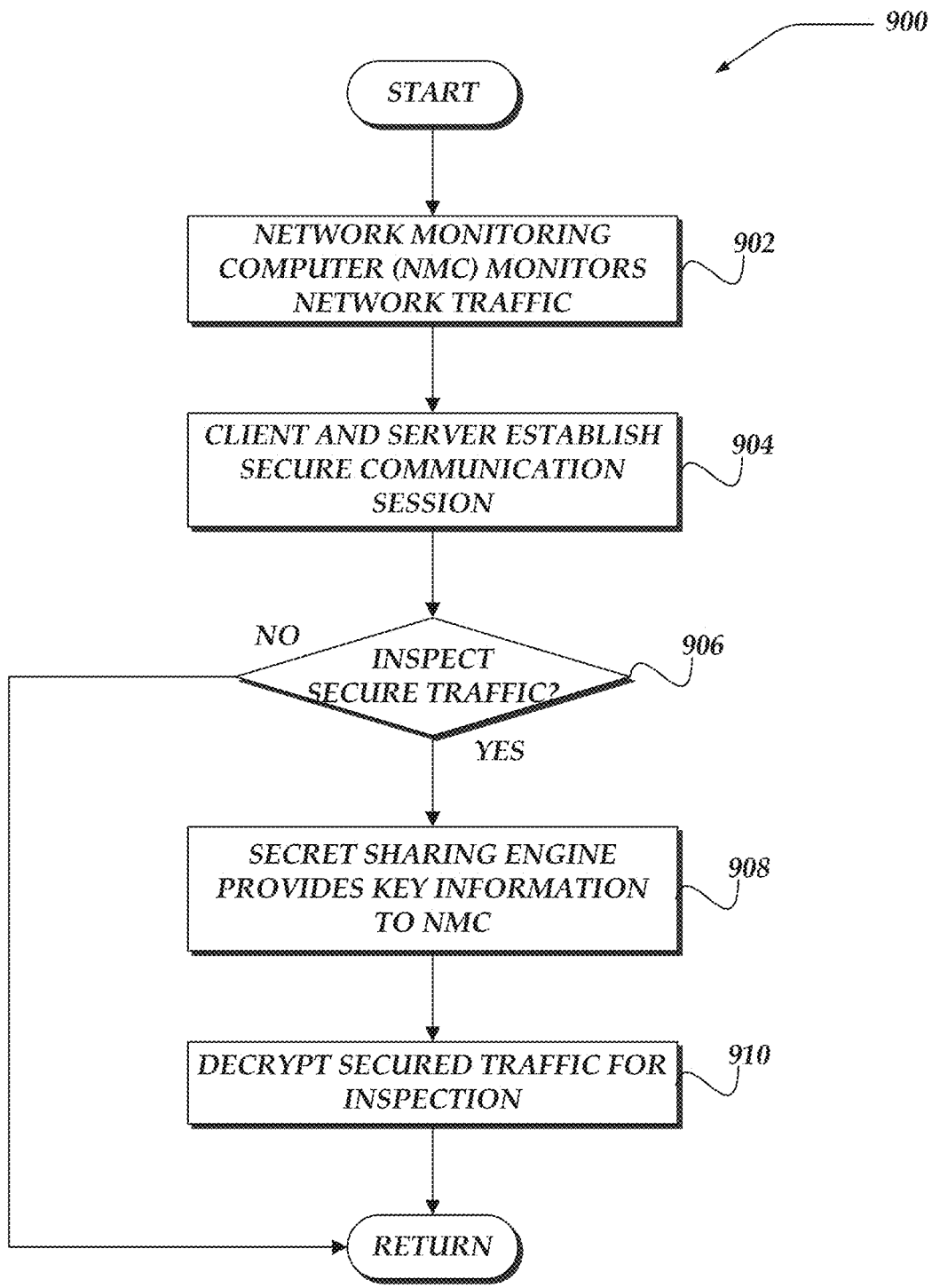
FIG. 9 illustrates an overview flowchart of a process for inline secret sharing in accordance with at least one of the various embodiments.
Figure 10:
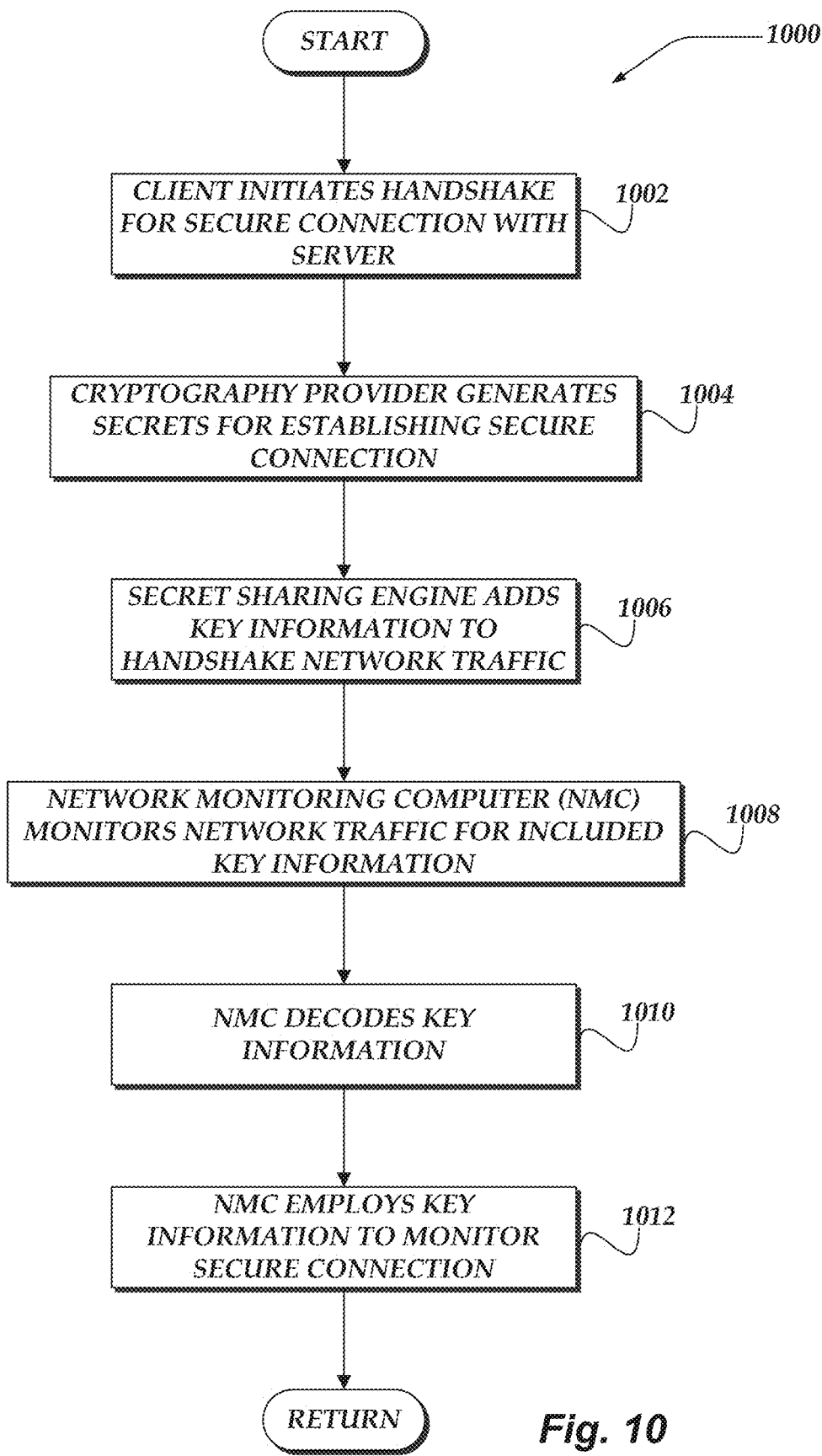
FIG. 10 illustrates a flowchart of a process for sharing key information with a network monitoring computer (NMC) for inline secret sharing in accordance with one or more of the various embodiments.

FIGS. 9-10 represent generalized operations for inline secret sharing in accordance with at least one of the various embodiments. In at least one of the various embodiments, processes 900, and 1000 described in conjunction with FIGS. 9-10 may be implemented by and/or executed by one or more processors on a single network computer (or network monitoring computer), such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by and/or executed on one or more virtualized computers, such as, those in a cloud-based environment. However, embodiments are not so limited and various combinations of network computers, client computers, specialized computers, or the like, may be utilized. Further, in at least one of the various embodiments, the processes described in conjunction with FIGS. 9-10 may be used for inline secret sharing in accordance with at least one of the various embodiments or architectures such as those described in conjunction with FIGS. 4-8. Further, in at least one of the various embodiments, some or all of the actions performed by processes 900, and 1000 may be executed in part by network monitoring engine 322, packet capture engine 324, crypto provider 326, or secret sharing engine 327, executed by one or more processors of one or more network computers.

FIG. 9 illustrates a flowchart of process 900 for inline secret sharing in accordance with at least one of the various embodiments. After a start block, at block 902, in one or more of the various embodiments, a network monitoring computer (NMC) may be arranged to monitor network traffic on one or more networks as described above.

At block 904, in one or more of the various embodiments, one or more clients or one or more servers may establish one or more secure communication sessions. In one or more of the various embodiments, the NMC may be arranged to passively monitor network traffic between the clients and services to detect or discover clients and servers that establish secure communication sessions. For example, in some embodiments, the NMC may be arranged to detect if communicating computers perform a communication handshake that may be associated with one or more secure communication protocols.

At decision block 906, in one or more of the various embodiments, if the NMC is configured to inspect the secure network traffic associated with the secure communication sessions, control may flow to block 908; otherwise, control may be returned to a calling process.

In one or more of the various embodiments, the NMC may be arranged to apply or execute one or more rules or configuration information to selectively determine if the secure communication session should be monitored. Likewise, in some embodiments, a secret sharing running on a client or server participating in the secure communication session may be arranged to communicate with the NMC to initiate inspection of the encrypted network traffic comprising the secure communication session. For example, in some embodiments, if a client is requesting access to a particular resource or application, a secret sharing engine on a server may be arranged to provide a private signal the NMC to initiate inspection of the secure traffic.

At block 908, in one or more of the various embodiments, a secret sharing engine may be arranged to provide key information to the NMC. In one or more of the various embodiments, one or more secret sharing engines hosted on clients or servers participating in the secure communication session may be arranged to communicate key information, or the like, that may be necessary for decrypting the secure communication sessions to the NMC. In some embodiments, the key information may be communicated over a network that may be physical or logically separated from the networks used for the secure communication sessions. In some embodiments, the same networks may be used.

Also, in some embodiments, the key information may be communicated during the handshake process used to establish the secure session. In one or more of the various embodiments, a secret sharing engine may include the key information in fields or packets sent between the client and server (or vice versa) during the handshake. As mentioned above, the key information included by the secret sharing information may include key information that normally may be exchanged between the client or server. Accordingly, in one or more of the various embodiments, the secret sharing agent may be arranged to explicitly share key information with the NMC that would otherwise remain inaccessible. In one or more of the various embodiments, the secret sharing agent may be arranged to secure the included key information using encryption that is separate from the secure session encryption or the handshake information used to establish the secure communication session. For example, in one or more of the various embodiments, the secret sharing engines and the NMC may be arranged to employ separate keys or protocols to secure the added key information separate from the secure session.

At block 910, in one or more of the various embodiments, the NMC may be arranged to decrypt network traffic comprising the secure sessions for inspection. In one or more of the various embodiments, the NMC may be arranged to apply various configuration information or rule-based policies to determine if network traffic associated with the secure session should be decrypted. Likewise, in one or more of the various embodiments, the NMC may be arranged to apply configuration information or rule-based policies to determine various actions to perform, such as, determining which network packets or network flows to inspect, looking for particular types of content or patterns, tracking application behavior, or the like, or combination thereof.

Further, in one or more of the various embodiments, the NMC may be arranged to selectively decrypt network traffic in one or more network flows based on the content or behavior of one or more other network flows. Accordingly, in some embodiments, inspecting decrypted packets from one network flow may trigger one or more associated network flows to be decrypted. For example, in some embodiments, discovering suspicious content in one network flow may initiate policies that require decryption and inspection of other network flows that may be accessing the same type of resources or applications, originating from the same network, flows with packets of a similar size, or the like. In some embodiments, the particular conditions for triggering inspections of related network and the determination of the "related" network flows may be provided by configuration information that includes rules, scripts, pattern matching, or the like, or combination thereof.

Likewise, in some embodiments, a secret sharing agent running on a client or server participating in the secure communication session may be arranged to communicate with the NMC to select or influence the inspection policy associated with of the encrypted network traffic comprising the secure communication session. For example, in some embodiments, a secret sharing engine on a server may be arranged to provide a private signal the NMC to initiate particular traffic management policies to apply to the secure traffic if a client is requesting access to a particular resource or application.

In one or more of the various embodiments, by decrypting the network traffic associated with the secure sessions, the NMC may be enabled to perform inspections that would be impossible or difficult to perform on the encrypted network traffic. Accordingly, in one or more of the various embodiments, one or more network monitoring policies may be applied to the secure sessions that otherwise would be unavailable. Next, control may be returned to a calling process.

FIG. 10 illustrates a flowchart of process 1000 for sharing key information with a network monitoring computer (NMC) for inline secret sharing in accordance with at least one of the various embodiments. After a start a block, at block 1002, in one or more of the various embodiments, a client may initiate a handshake process for establishing a secure connection session with a server as described above.

At block 1004, in one or more of the various embodiments, a crypto provider on the client that initiated the secure connection may be arranged to provide the required secrets and handshake information as appropriate for the secure cryptographic communication protocol that may be in use. In one or more of the various embodiments, the client may be pre-configured with configuration information for one or more parameters or assets that may be required to setup the secure communication session. For example, in one or more of the various embodiments, the cryptographic provider may be arranged to support one or more particular cryptographic protocols, cipher suites, key strengths, or the like. Likewise, for example, in some embodiments, various cryptographic assets, such as, digital certificates, object signing certificates, user certificates, Certificate Authority (CA) certificates, or the like, or combination thereof.

At block 1006, in one or more of the various embodiments, the secret sharing engine may be arranged to modify some of the outbound network traffic to include key information to be used by the NMC. In one or more of the various embodiments, the secret sharing agent may take some or all of the key information provided by the cryptographic provider and include it in one or more fields or packets of the outbound network traffic. In one or more of the various embodiments, the composition of the key information added to the outbound network traffic may vary depending on the particular cryptographic protocol or cipher suites that may be used to establish the secure connection. However, the key information included in the traffic by the secret sharing engine may be selected such that it may be sufficient to enable the NMC to decrypt network traffic that may be subsequently exchanged over the secure connection.

At block 1008, in one or more of the various embodiments, a NMC may be arranged to monitor network traffic sent over the one or more networks. In particular, as described above, the NMC may be arranged to monitor network traffic that may be exchanged between clients and servers on the network. In one or more of the various embodiments, the NMC may be arranged to identify the key information that was added by the secret sharing agent.

In one or more of the various embodiments, the secret sharing agent may encrypt the key information using a cryptographic process that is both separate and independent of the secure protocol used by the client and server enabling the secret sharing agent and the NMC to privately exchange information as needed. For example, in some embodiments, the secret sharing engines and the NMC may employ pre-shared keys, public key encryption, certificates, or signatures, or the like, to encrypt the key information that it include in the handshake network traffic.

In one or more of the various embodiments, the secret sharing agent may be arranged to embed the key information in one or more network packets that comprise the handshake traffic. Accordingly, in one or more of the various embodiments, the particular fields or format of the added key information may be selected or arranged such that the added key information does not interfere with the clients and servers normal use of the secure communication protocol.

In one or more of the various embodiments, the secret sharing agent may be arranged to send the encrypted network packets that may be separate from the handshake traffic. Accordingly, in one or more of the various embodiments, the secret sharing agent and the NMC may be arranged to employ a custom or private communication protocol to exchange the key information rather than embed the key information in network packets or traffic comprising the handshake between the client and server. In some embodiments, the separate traffic carrying the key information to the NMC may include correlation information that enables the NMC to associate the key information provided by a secret sharing agent the network flows that comprise the secure connection between the clients and servers.

In one or more of the various embodiments, the NMC may be arranged to recognize patterns, keywords, key values, or the like, that may indicate that the secret sharing agent has included key information in the network traffic. Likewise, the NMC may be arranged to recognize that a well-known cryptographic protocol handshake is in process. Accordingly, in one or more of the various embodiments, the NMC may be triggered to look for key information that may have been added to the network traffic associated with the handshake.

At block 1010, in one or more of the various embodiments, the NMC may be arranged to decode the key information provided by one or more of the secret sharing agents. As described above, the NMC and one or more secret sharing agents may be arranged to privately share key information using a private secure protocol. Accordingly, in some embodiments, the NMC may be decode or decrypt the key information.

At block 1012, in one or more of the various embodiments, the NMC may be arranged to employ the key information to monitor the secure connections. As described above, in some embodiments, the NMC may employ the key information to generate the keys or secrets that may be necessary to decrypt the network traffic comprising the secure connection. Accordingly, the NMC may be enabled to apply various policies related to traffic monitoring, packet capturing, traffic management, or the like, based on inspecting the decrypted network traffic. Next, control may be returned to a calling process.

It will be understood that each block of the flowchart illustration, and combinations of blocks in the flowchart illustration, can be implemented by computer program instructions. These program instructions may be provided to one or more processors to produce a machine, such that the instructions, which execute on the one or more processors, create means for implementing the actions specified in the flowchart block or blocks. The computer program instructions may be executed by the one or more processors to cause a series of operational steps to be performed by the one or more processors to produce a computer-implemented process such that the instructions, which execute on the one or more processors to provide steps for implementing the actions specified in the flowchart block or blocks. The computer program instructions may also cause at least some of the operational steps shown in the blocks of the flowchart to be performed in parallel and/or concurrently by the one or more processors and/or one or more computers. Moreover, some of the steps may also be performed across more than one processor or computer. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware based systems, which perform the specified actions or steps, or combinations of special purpose hardware and computer instructions. The foregoing example should not be construed as limiting and/or exhaustive, but rather, an illustrative use case to show an implementation of at least one of the various embodiments of the invention.

Further, in one or more embodiments (not shown in the figures), the logic in the illustrative flowcharts may be executed using one or more embedded logic hardware devices instead of one or more CPUs, such as, Application Specific Integrated Circuits (ASICs), Field Programmable Gate Arrays (FPGAs), Programmable Array Logic chips (PALs), or the like, or combination thereof. The embedded one or more logic hardware devices may directly execute their embedded logic to perform actions. In at least one embodiment, one or more microcontrollers may be arranged as system-on-a-chip (SOCs) to directly execute their own locally embedded logic to perform actions and access their own internal memory and their own external Input and Output Interfaces (e.g., hardware pins and/or wireless transceivers) to perform actions described herein.

What is claimed as new and desired to be protected by Letters Patent of the United States is:

1. A method for monitoring communication over a network between a plurality of computers, with one or more network monitoring computers (NMCs) that perform actions, comprising:

employing handshake information communicated between two computers to determine establishment of a secure communication session;

determining a session key based on decryption of encrypted key information that corresponds to the secure communication session, wherein decrypted key information is added to the handshake information; and employing the session key to decrypt one or more encrypted network packets that are included in the secure communication session.

2. The method of claim 1, further comprising:
employing the one or more decrypted network packets to execute one or more rule-based policies.

3. The method of claim 1, further comprising:
selectively decrypting the one or more network packets based on one or more characteristics of one or more other network flows unassociated with the secure communication session.

4. The method of claim 1, further comprising:
selectively decrypt one or more network flows associated with the secure communication channel based on one or more characteristics of one or more other flows unassociated with the secure communication session.

5. The method of claim 1, further comprising:
providing inline proxying of communication over the secure communication session for the two computers.

6. The method of claim 1, wherein the two computers further comprise employing a different secure communication protocol for the secure communication session than the other computer.

7. A system for monitoring communication over a network between two or more computers, comprising:
one or more network monitoring computers (NMCs) that communicate over the network, including:
a memory that stores at least instructions; and
one or more processors that execute instructions that perform actions, including:
employing handshake information communicated between two computers to determine establishment of a secure communication session;
determining a session key based on decryption of encrypted key information that corresponds to the secure communication session, wherein decrypted key information is added to the handshake information; and
employing the session key to decrypt one or more encrypted network packets that are included in the secure communication session.

8. The system of claim 7, further comprising:
employing the one or more decrypted network packets to execute one or more rule-based policies.

9. The system of claim 7, further comprising:
selectively decrypting the one or more network packets based on one or more characteristics of one or more other network flows unassociated with the secure communication session.

10. The system of claim 7, further comprising:
selectively decrypt one or more network flows associated with the secure communication channel based on one or more characteristics of one or more other flows unassociated with the secure communication session.

11. The system of claim 7, further comprising:
providing inline proxying of communication over the secure communication session for the two computers.

12. The system of claim 7, wherein the two computers further comprise employing a different secure communication protocol for the secure communication session than the other computer.

13. A processor readable non-transitory storage media that includes instructions for monitoring communication over a network between two or more computers, wherein execution of the instructions by one or more processors on one or more network monitoring computers (NMCs) performs actions, comprising:
    employing handshake information communicated between two computers to determine establishment of a secure communication session;
    determining a session key based on decryption of encrypted key information that corresponds to the secure communication session, wherein decrypted key information is added to the handshake information; and
    employing the session key to decrypt one or more encrypted network packets that are included in the secure communication session.

14. The processor readable non-transitory storage media of claim 13, wherein execution of the instructions performs further actions, comprising:
    employing the one or more decrypted network packets to execute one or more rule-based policies.

15. The processor readable non-transitory storage media of claim 13, wherein execution of the instructions performs further actions, comprising:
    selectively decrypting the one or more network packets based on one or more characteristics of one or more other network flows unassociated with the secure communication session.

16. The processor readable non-transitory storage media of claim 13, wherein execution of the instructions performs further actions, comprising:
    selectively decrypt one or more network flows associated with the secure communication channel based on one or more characteristics of one or more other flows unassociated with the secure communication session.

17. The processor readable non-transitory storage media of claim 13, wherein execution of the instructions performs further actions, comprising:
    providing inline proxying of communication over the secure communication session for the two computers.

* * * * *